(12) United States Patent
Cheng et al.

(10) Patent No.: US 10,932,243 B2
(45) Date of Patent: Feb. 23, 2021

(54) UPLINK CONTROL INFORMATION TRANSMISSION METHOD, TERMINAL DEVICE, BASE STATION, AND COMMUNICATIONS SYSTEM

(71) Applicant: HUAWEI TECHNOLOGIES CO., LTD., Guangdong (CN)

(72) Inventors: Yan Cheng, Beijing (CN); Hao Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,738

(22) Filed: Jul. 8, 2019

(65) Prior Publication Data

US 2019/0335450 A1    Oct. 31, 2019

Related U.S. Application Data

(63) Continuation of application No. 15/920,253, filed on Mar. 13, 2018, now Pat. No. 10,362,567, which is a
(Continued)

(51) Int. Cl.
*H04W 72/04* (2009.01)
*H04L 27/26* (2006.01)
(Continued)

(52) U.S. Cl.
CPC .......... *H04W 72/0413* (2013.01); *H04B 7/12* (2013.01); *H04J 13/0059* (2013.01);
(Continued)

(58) Field of Classification Search
CPC ......... H04W 72/0413; H04W 72/0446; H04W 72/14; H04B 7/12; H04J 13/0059;
(Continued)

(56) References Cited

U.S. PATENT DOCUMENTS

| 2008/0075184 A1 | 3/2008 | Muharemovic et al. |
| 2009/0097457 A1 | 4/2009 | Papasakellariou et al. |

(Continued)

FOREIGN PATENT DOCUMENTS

| CN | 102111886 A | 6/2011 |
| CN | 102378385 A | 3/2012 |

(Continued)

OTHER PUBLICATIONS

R1-070394—Nokia, "Multiplexing of L1/L2 Control Signals between UEs in the absence of UL data," 3GPP TSG RAN WG1 Meeting #47bis, Sorrento, Italy, XP050104426, Jan. 15-19, 2007, 6 pages.

(Continued)

*Primary Examiner* — Hashim S Bhatti
(74) *Attorney, Agent, or Firm* — Fish & Richardson P.C.

(57) ABSTRACT

Embodiments of the present disclosure provide example uplink control information transmission methods, terminal devices, base stations, and systems. An example transmission method includes the following steps: First, the terminal device determines an information bit sequence of to-be-transmitted uplink control information. Then, the terminal device determines a first sequence according to the information bit sequence, where the first sequence is a linear-phase complex exponential sequence. Finally, the terminal device sends the to-be-transmitted uplink control information to the base station by using an uplink control channel, where the uplink control channel occupies N symbols, N is a positive integer, a signal carried on a symbol l of the N symbols is directly proportional to a product of the first sequence and a second sequence, and the second sequence is a cyclic shift sequence.

20 Claims, 10 Drawing Sheets

Related U.S. Application Data continuation of application No. PCT/CN2015/089538, filed on Sep. 14, 2015.

(51) Int. Cl.
*H04B 7/12* (2006.01)
*H04J 13/00* (2011.01)
*H04L 5/00* (2006.01)
*H04W 72/14* (2009.01)

(52) U.S. Cl.
CPC .......... *H04L 5/0021* (2013.01); *H04L 5/0053* (2013.01); *H04L 27/26* (2013.01); *H04L 27/2613* (2013.01); *H04W 72/0446* (2013.01); *H04W 72/14* (2013.01); *H04L 27/2636* (2013.01)

(58) Field of Classification Search
CPC . H04L 5/0021; H04L 5/0053; H04L 27/2613; H04L 27/26; H04L 27/2636; H04L 27/2607; H04L 27/2646; H03M 13/136
See application file for complete search history.

(56) References Cited

U.S. PATENT DOCUMENTS

| | | | |
|---|---|---|---|
| 2009/0175159 A1 | 7/2009 | Bertrand et al. | |
| 2011/0038387 A1 | 2/2011 | Han et al. | |
| 2013/0044581 A1 | 2/2013 | Cho et al. | |
| 2013/0286977 A1* | 10/2013 | Kwon | H04L 5/0091 370/329 |
| 2013/0294353 A1 | 11/2013 | Han et al. | |
| 2013/0343327 A1 | 12/2013 | Jang et al. | |
| 2014/0301324 A1* | 10/2014 | Cheng | H04L 5/0055 370/329 |
| 2015/0043476 A1* | 2/2015 | Takeda | H04L 5/001 370/329 |
| 2018/0103475 A1* | 4/2018 | Qu | H04W 72/04 |
| 2018/0198568 A1* | 7/2018 | Takeda | H04L 5/0055 |

FOREIGN PATENT DOCUMENTS

| | | |
|---|---|---|
| CN | 102884770 A | 1/2013 |
| CN | 103178926 A | 6/2013 |
| CN | 103281277 A | 9/2013 |
| JP | 2010525728 A | 7/2010 |
| JP | 2010536230 A | 11/2010 |
| JP | 2014045496 A | 3/2014 |
| JP | 2014096805 A | 5/2014 |
| KR | 20140052949 A | 5/2014 |
| WO | 2011084356 A1 | 7/2011 |
| WO | 2012018228 A2 | 2/2012 |

OTHER PUBLICATIONS

R1-072856—Texas Instruments,"Uplink ACK/NAK Transmission for Persistently Scheduled Downlink Packets," 3GPP TSG RAN WG1 #49, Orlando, USA, Jun. 25-29, 2007, 8 pages.
PCT International Search Report and Written Opinion issued in International Application No. PCT/CN2015/089538 dated May 27, 2016, 10 pages (with English translation).
Office Action issued in Japanese Application No. 2018-532489 dated Dec. 11, 2018, 5 pages (with English translation).
Extended European Search Report issued in European Application No. 15903794.4 dated Jul. 9, 2018, 10 pages.
Office Action issued in Chinese Application No. 201580083111.6 dated Jul. 8, 2019, 6 pages.
3GPP TS 36.212 V12.5.0 (Jun. 2015), "3rd Generation Partnership Project; Technical Specification Group Radio Access Network; Evolved Universal Terrestrial Radio Access (E-UTRA); Multiplexing and channel coding (Release 12)," Jun. 2015), 94 pages.
Office Action issued in Korean Application No. 2020-7009628 dated Apr. 20, 2020, 8 pages (with English translation).
Office Action issued in Chinese Application No. 201580083111.6 dated Apr. 27, 2020, 7 pages (with English translation).
3GPP TS 36.211 V12.6.0 (2015-06), "3rd Generation Partnership Project; Technical Specification Group Radio Acces Network; Evolved Universal Terrestrial Radio Access (E-UTRA); Physical channels and modulation (Release 12)," Jun. 2015, 136 pages.
Office Action issued in Korean Application No. 20207009628 dated Oct. 7, 2020, 7 pages (with English translation).

* cited by examiner

UPLINK CONTROL INFORMATION TRANSMISSION METHOD, TERMINAL DEVICE, BASE STATION, AND COMMUNICATIONS SYSTEM

CROSS-REFERENCE TO RELATED APPLICATIONS

This application is a continuation of U.S. patent application Ser. No. 15/920,253, filed on Mar. 13, 2018, which is a continuation of International Application No. PCT/CN2015/089538, filed on Sep. 14, 2015. All of the afore-mentioned patent applications are hereby incorporated by reference in their entireties.

TECHNICAL FIELD

Embodiments of the present disclosure relate to the wireless communications field, and more specifically, to an uplink control information transmission method, a terminal device, a base station, and a communications system.

BACKGROUND

In an existing long term evolution (LTE) system, a subframe has duration of 1 millisecond (ms), and each subframe includes 14 time-domain symbols. Usually, in the LTE system, uplink control information may be transmitted in an uplink subframe by using a physical uplink control channel (PUCCH). An existing PUCCH occupies 14 time-domain symbols.

To support technologies such as dynamic scheduling, downlink multiple-input multiple-output (MIMO) transmission, and hybrid automatic repeat request, a terminal device needs to feed back, to a base station, uplink control information (UCI), including channel state information CSI, a hybrid automatic repeat request-acknowledgment HARQ-ACK, a scheduling request (SR), and the like. The hybrid automatic repeat request-acknowledgment may be simply referred to as an acknowledgment (ACK)/negative acknowledgment (NACK).

In a future evolved LTE system, a TTI (Transmission Time Interval) may be reduced to reduce a service latency, that is, the transmission time interval TTI may not be one subframe, for example, may include less than seven time-domain symbols. When the TTI is reduced, an uplink control channel for uplink control information transmission, such as a physical uplink control channel PUCCH, may occupy less than 14 symbols in a time domain.

In addition, in a future evolved LTE TDD system, a new subframe type is introduced. A subframe of the new subframe type includes a symbol used for downlink transmission, a symbol used for uplink transmission, and a guard period GP. Uplink control information may be transmitted on the symbol used for uplink transmission in the subframe of the new subframe type. For example, in the future evolved LTE system, a subframe type shown in FIG. 1 may be introduced. A subframe of the subframe type shown in FIG. 1 includes 11 symbols used for downlink transmission, a guard period (GP) with duration of one symbol, and two symbols used for uplink transmission. The uplink control information may be transmitted on the two symbols used for uplink transmission.

The existing physical uplink control channel PUCCH needs to occupy 14 symbols in the time domain, and is inapplicable to uplink control information transmission in a short-TTI scenario or in a subframe of the new subframe type. Therefore, a new uplink control channel structure needs to be designed for uplink control information transmission.

SUMMARY

Embodiments of the present disclosure provide an uplink control information transmission method, a terminal device, a base station, and a communications system, so as to resolve an existing problem that uplink control information transmission cannot be performed on a PUCCH that occupies fewer symbols than those included in one subframe.

According to a first aspect of the present disclosure, an uplink control information transmission method is provided, including: determining, by a terminal device, an information bit sequence of to-be-transmitted uplink control information; determining, by the terminal device, a first sequence according to the information bit sequence, where the first sequence is a linear-phase complex exponential sequence; and sending, by the terminal device, the to-be-transmitted uplink control information to a base station by using an uplink control channel, where the uplink control channel occupies N symbols, N is a positive integer, a signal carried on a symbol l of the N symbols is directly proportional to a product of the first sequence and a second sequence, and the second sequence is a cyclic shift sequence.

With reference to the first aspect, in a first possible implementation, the determining, by the terminal device, a first sequence according to the information bit sequence includes: determining, by the terminal device, a first bit sequence according to the information bit sequence and the symbol quantity N of the uplink control channel, where a bit quantity of the first bit sequence is N or 2N; determining, by the terminal device according to the first bit sequence, a second bit sequence carried on the symbol l, where the second bit sequence is a part, carried on the symbol l, of the first bit sequence; and determining, by the terminal device, the corresponding first sequence according to the second bit sequence carried on the symbol l.

With reference to the first possible implementation of the first aspect, in a second possible implementation, a bit quantity of the information bit sequence is 1, and the terminal device determines that the bit quantity of the first bit sequence is N, and that the first bit sequence is obtained by cyclically repeating the information bit sequence for N times.

With reference to the first possible implementation of the first aspect, in a third possible implementation, a bit quantity of the information bit sequence is 2, and the terminal device determines that the bit quantity of the first bit sequence is 2N, and that the first bit sequence is obtained by cyclically repeating the information bit sequence for N times.

With reference to the first possible implementation of the first aspect, in a fourth possible implementation, a bit quantity of the information bit sequence is greater than or equal to 3 and less than or equal to 2N, and the terminal device determines that the bit quantity of the first bit sequence is 2N, and that the first bit sequence is obtained from the information bit sequence by means of Reed-Muller coding.

With reference to any one of the first possible implementation to the fourth possible implementation of the first aspect, in a fifth possible implementation, the determining, by the terminal device, the corresponding first sequence according to the second bit sequence carried on the symbol l includes: when a bit quantity of the second bit sequence carried on the symbol l is 1, if the second bit sequence is 0, the first sequence is {1,1,1,1,1,1,1,1,1,1,1,1}; or if the second bit sequence is 1, the first sequence is {1,−1,1,−1,1,−1,1,−1,1,−1,1,−1}; or when a bit quantity of the second bit sequence carried on the symbol l is 2, if the second bit sequence is 00, the first sequence is {1,1,1,1,1,1,1,1,1,1,1,1}; if the second bit sequence is 01, the first sequence is {1, −j,1,−1,1,−j,1,−1,1,−j,1,−1}; if the second bit sequence is 10, the first sequence is {1,−1,1,−1,1,−1,1,−1,1,−1,1,−1}; or if the second bit sequence is 11, the first sequence is {1,j,−1, −j,1,j,−1, −j,1,j,−1, −j}.

With reference to the first aspect, in a sixth possible implementation, the determining, by the terminal device, a first sequence according to the information bit sequence includes: when a bit quantity of the information bit sequence is 1, if the information bit sequence is 0, the first sequence is {1,1,1,1,1,1,1,1,1,1,1,1}; or if the information bit sequence is 1, the first sequence is {1,−1,1,−1,1,−1,1,−1,1,−1,1,−1}; or when a bit quantity of the information bit sequence is 2, if the information bit sequence is 00, the first sequence is {1,1,1,1,1,1,1,1,1,1,1,1}; if the information bit sequence is 01, the first sequence is {1, −j,1,−1,1,−j,1,−1,1,−j,1,−1}; if the information bit sequence is 10, the first sequence is {1,−1,1,−1,1,−1,1,−1,1,−1,1,−1}; or if the information bit sequence is 11, the first sequence is {1,j,−1, −j,1,j,−1, −j,1,j,−1, −j}.

With reference to any one of the first aspect to the sixth possible implementation, in a seventh possible implementation, the second sequence is a Zadoff-Chu sequence, or a sequence obtained from a Zadoff-Chu sequence by means of cyclic extension or truncation.

With reference to any one of the first aspect to the seventh possible implementation, in an eighth possible implementation, the symbol quantity N of the uplink control channel is less than a quantity of symbols included in one subframe.

According to a second aspect of the present disclosure, an uplink control information transmission method is provided, including: receiving, by a base station, uplink control information sent by a terminal device by using an uplink control channel, where the uplink control channel occupies N symbols, N is a positive integer, a signal carried on a symbol l of the N symbols is directly proportional to a product of a first sequence and a second sequence, and the second sequence is a cyclic shift sequence; determining, by the base station, the first sequence according to an information bit quantity of the uplink control information and the second sequence, where the first sequence is a linear-phase complex exponential sequence; and determining, by the base station, an information bit sequence of the uplink control information according to the first sequence.

With reference to the second aspect, in a second possible implementation, the determining, by the base station, an information bit sequence of the uplink control information according to the first sequence includes: determining, by the base station according to the information bit quantity of the uplink control information, a bit quantity of a second bit sequence carried on the symbol l; determining, by the base station according to the first sequence and the bit quantity of the second bit sequence carried on the symbol l, the second bit sequence carried on the symbol l; and determining, by the base station, the information bit sequence of the uplink control information according to the second bit sequence carried on the symbol l, where the determining, by the base station according to the first sequence and the bit quantity of the second bit sequence carried on the symbol l, the second bit sequence carried on the symbol l includes: when the bit quantity of the second bit sequence carried on the symbol l is 1, if the first sequence is {1,1,1,1,1,1,1,1,1,1,1,1}, the second bit sequence carried on the symbol l is 0; or if the first sequence is {1,−1,1,−1,1,−1,1,−1,1,−1,1,−1}, the second bit sequence carried on the symbol l is 1; or when the bit quantity of the second bit sequence carried on the symbol l is 2, if the first sequence is {1,1,1,1,1,1,1,1,1,1,1,1}, the second bit sequence carried on the symbol l is 00; if the first sequence is {1, −j,1,−1,1,−j,1,−1,1,−j,1,−1}, the second bit sequence carried on the symbol l is 01; if the first sequence is {1,−1,1,−1,1,−1,1,−1,1,−1,1,−1}, the second bit sequence carried on the symbol l is 10; or if the first sequence is {1,j,−1, −j,1,j,−1, −j,1,j,−1, −j}, the second bit sequence carried on the symbol l is 11.

With reference to the second aspect, in a third possible implementation, the determining, by the base station, an information bit sequence of the uplink control information according to the first sequence includes: determining, by the base station, the information bit sequence of the uplink control information according to the first sequence and the bit quantity of the uplink control information, where the determining includes: when the bit quantity of the uplink control information is 1, if the first sequence is {1,1,1,1,1,1,1,1,1,1,1,1}, a second bit sequence carried on the symbol l is 0; or if the first sequence is {1,−1,1,−1,1,−1,1,−1,1,−1,1,−1}, a second bit sequence carried on the symbol l is 1; or when the bit quantity of the uplink control information is 2, if the first sequence is {1,1,1,1,1,1,1,1,1,1,1,1}, a second bit sequence carried on the symbol l is 00; if the first sequence is {1, −j,1,−1,1,−j,1,−1,1,−j,1,−1}, a second bit sequence carried on the symbol l is 01; if the first sequence is {1,−1,1,−1,1,−1,1,−1,1,−1,1,−1}, a second bit sequence carried on the symbol l is 10; or if the first sequence is {1,j,−1, −j,1,j,−1, −j,1,j,−1, −j}, a second bit sequence carried on the symbol l is 11.

With reference to any one of the second aspect to the third possible implementation, in a fourth possible implementation, the second sequence is a Zadoff-Chu sequence, or a sequence obtained from a Zadoff-Chu sequence by means of cyclic extension or truncation.

With reference to any one of the second aspect to the fourth possible implementation, in a fifth possible implementation, the symbol quantity N of the uplink control channel is less than a quantity of symbols included in one subframe.

According to a third aspect of the present disclosure, an uplink control information transmission method is provided, including: determining, by a terminal device, an information bit sequence of to-be-transmitted uplink control information; determining, by the terminal device according to the information bit sequence, a second bit sequence carried on a symbol l of an uplink control channel, where the uplink control channel occupies N symbols, N is a positive integer, l is an integer, and l=0, 1, . . . , N−1; determining, by the terminal device according to a status value of the second bit sequence, a cyclic shift of a third sequence corresponding to the symbol l, and determining, according to the cyclic shift, the third sequence corresponding to the symbol l; and mapping, by the terminal device, the third sequence corresponding to the symbol l onto the symbol l of the uplink control channel, and sending the third sequence to a base station.

With reference to the third aspect, in a first possible implementation, the determining, by the terminal device according to the information bit sequence, a second bit sequence carried on a symbol l of an uplink control channel includes: determining, by the terminal device, a first bit sequence according to the information bit sequence and the quantity N of symbols occupied by the uplink control channel, where a bit quantity of the first bit sequence is N or 2N; and determining, by the terminal device according to the first bit sequence, the second bit sequence carried on the symbol l of the uplink control channel, where the second bit sequence carried on the symbol l is a part, carried on the symbol l, of the first bit sequence.

With reference to the first possible implementation of the third aspect, in a second possible implementation, a bit quantity of the information bit sequence is 1, and the terminal device determines that the bit quantity of the first bit sequence is N, and that the first bit sequence is obtained by cyclically repeating the information bit sequence for N times.

With reference to the first possible implementation of the third aspect, in a third possible implementation, a bit quantity of the information bit sequence is 2, and the terminal device determines that the bit quantity of the first bit sequence is 2N, and that the first bit sequence is obtained by cyclically repeating the information bit sequence for N times.

With reference to the first possible implementation of the third aspect, in a fourth possible implementation, a bit quantity of the information bit sequence is greater than or equal to 3 and less than or equal to 2N, and the terminal device determines that the bit quantity of the first bit sequence is 2N, and that the first bit sequence is obtained from the information bit sequence by means of Reed-Muller coding.

With reference to any one of the third aspect to the fourth possible implementation, in a fifth possible implementation, the status value of the second bit sequence is corresponding to the cyclic shift of the third sequence, the status value of the second bit sequence is one of M status values, the M status values are in a one-to-one correspondence to M cyclic shifts, M is 2 raised to the power of $M_1$, $M_1$ is a bit quantity of the second bit sequence, and both M and $M_1$ are positive integers.

With reference to the fifth possible implementation of the third aspect, in a sixth possible implementation, an interval of cyclic shifts corresponding to any two of the M status values is greater than or equal to 2.

With reference to any one of the third aspect to the sixth possible implementation, in a seventh possible implementation, the third sequence is a Zadoff-Chu sequence, or a sequence obtained from a Zadoff-Chu sequence by means of cyclic extension or truncation.

With reference to any one of the third aspect to the seventh possible implementation, in an eighth possible implementation, the symbol quantity N of the uplink control channel is less than a quantity of symbols included in one subframe.

According to a fourth aspect of the present disclosure, an uplink control information transmission method is provided, including: receiving, by a base station, uplink control information sent by a terminal device by using an uplink control channel, where the uplink control channel occupies N symbols, N is a positive integer, a signal carried on a symbol l of the N symbols is corresponding to a third sequence, the third sequence is a cyclic shift sequence, l is an integer, and l=0, 1, . . . , N−1; determining, by the base station according to an information bit quantity of the uplink control information, the third sequence corresponding to the signal carried on the symbol l; and determining, by the base station, an information bit sequence of the uplink control information according to the third sequence corresponding to the signal carried on the symbol l.

With reference to the fourth aspect, in a first possible implementation, the determining, by the base station, an information bit sequence of the uplink control information according to the third sequence corresponding to the signal carried on the symbol l further includes: determining, by the base station according to the third sequence corresponding to the signal carried on the symbol l, a second bit sequence carried on the symbol l; and determining the information bit sequence of the uplink control information according to the second bit sequence carried on the symbol l.

With reference to the first possible implementation of the fourth aspect, in a second possible implementation, the determining, by the base station according to the third sequence corresponding to the signal carried on the symbol l, a second bit sequence carried on the symbol l includes: determining, by the base station according to a cyclic shift of the third sequence corresponding to the signal carried on the symbol l, the second bit sequence carried on the symbol l, where the cyclic shift of the third sequence is corresponding to a status value of the second bit sequence, the cyclic shift of the third sequence is one of M cyclic shifts, the M cyclic shifts are in a one-to-one correspondence to M status values, M is 2 raised to the power of $M_1$, $M_1$ is a bit quantity of the second bit sequence, and both M and $M_1$ are positive integers.

With reference to the second possible implementation of the fourth aspect, in a third possible implementation, an interval of cyclic shifts corresponding to any two of the M status values is greater than or equal to 2.

With reference to any one of the fourth aspect to the third possible implementation, in a fourth possible implementation, the third sequence is a Zadoff-Chu sequence, or a sequence obtained from a Zadoff-Chu sequence by means of cyclic extension or truncation.

With reference to any one of the fourth aspect to the fourth possible implementation, in a fifth possible implementation, the symbol quantity N of the uplink control channel is less than a quantity of symbols included in one subframe.

According to a fifth aspect of the present disclosure, a terminal device is provided, including: a processing unit, configured to determine an information bit sequence of to-be-transmitted uplink control information, where the processing unit is further configured to determine a first sequence according to the information bit sequence, where the first sequence is a linear-phase complex exponential sequence; and a sending unit, configured to send the to-be-transmitted uplink control information to a base station by using an uplink control channel, where the uplink control channel occupies N symbols, N is a positive integer, a signal carried on a symbol l of the N symbols is directly proportional to a product of the first sequence and a second sequence, and the second sequence is a cyclic shift sequence.

With reference to the fifth aspect, in a first possible implementation, that the processing unit determines a first sequence according to the information bit sequence includes: determining, by the processing unit, a first bit sequence according to the information bit sequence and the symbol quantity N of the uplink control channel, where a bit quantity of the first bit sequence is N or 2N; determining, by the processing unit according to the first bit sequence, a second bit sequence carried on the symbol l, where the second bit sequence is a part, carried on the symbol l, of the first bit sequence; and determining, by the processing unit, the corresponding first sequence according to the second bit sequence carried on the symbol l.

With reference to the first possible implementation of the fifth aspect, in a second possible implementation, a bit quantity of the information bit sequence is 1, and the processing unit determines that the bit quantity of the first bit sequence is N, and that the first bit sequence is obtained by cyclically repeating the information bit sequence for N times.

With reference to the first possible implementation of the fifth aspect, in a third possible implementation, a bit quantity of the information bit sequence is 2, and the processing unit determines that the bit quantity of the first bit sequence is 2N, and that the first bit sequence is obtained by cyclically repeating the information bit sequence for N times.

With reference to the first possible implementation of the fifth aspect, in a fourth possible implementation, a bit quantity of the information bit sequence is greater than or equal to 3 and less than or equal to 2N, and the processing unit determines that the bit quantity of the first bit sequence is 2N, and that the first bit sequence is obtained from the information bit sequence by means of Reed-Muller coding.

With reference to any one of the first possible implementation to the fourth possible implementation of the fifth aspect, in a fifth possible implementation, that the processing unit determines the corresponding first sequence according to the second bit sequence carried on the symbol l includes: when a bit quantity of the second bit sequence carried on the symbol l is 1, if the second bit sequence is 0, the first sequence is {1,1,1,1,1,1,1,1,1,1,1,1}; or if the second bit sequence is 1, the first sequence is {1,−1,1,−1, 1,−1,1,−1,1,−1,1,−1}; or when a bit quantity of the second bit sequence carried on the symbol l is 2, if the second bit sequence is 00, the first sequence is {1,1,1,1,1,1,1,1,1,1,1,1}; if the second bit sequence is 01, the first sequence is {1, −j,1,−1,1,−j,1,−1,1,−j,1,−1}; if the second bit sequence is 10, the first sequence is {1,−1,1,−1,1,−1,1,−1,1,−1,1,−1}; or if the second bit sequence is 11, the first sequence is {1,j,−1, −j,1,j,−1, −j,1,j,−1, −j}.

With reference to the fifth aspect, in a sixth possible implementation, that the processing unit determines a first sequence according to the information bit sequence includes: when a bit quantity of the information bit sequence is 1, if the information bit sequence is 0, the first sequence is {1,1,1,1,1,1,1,1,1,1,1,1}; or if the information bit sequence is 1, the first sequence is {1,−1,1,−1,1,−1,1, 1,−1,1,−1}; or when a bit quantity of the information bit sequence is 2, if the information bit sequence is 00, the first sequence is {1,1,1,1,1,1,1,1,1,1,1,1}; if the information bit sequence is 01, the first sequence is {1, −j,1,−1,1,−j,1,−1, 1,−j,1,−1}; if the information bit sequence is 10, the first sequence is {1,−1,1,−1,1,−1,1,−1,1,−1,1,−1}; or if the information bit sequence is 11, the first sequence is {1,j,−1, −j,1,j,−1, −j,1,j,−1, −j}.

With reference to any one of the fifth aspect to the sixth possible implementation, in a seventh possible implementation, the second sequence is a Zadoff-Chu sequence, or a sequence obtained from a Zadoff-Chu sequence by means of cyclic extension or truncation.

With reference to any one of the fifth aspect to the seventh possible implementation, in an eighth possible implementation, the symbol quantity N of the uplink control channel is less than a quantity of symbols included in one subframe.

According to a sixth aspect of the present disclosure, a base station is provided, including: a receiving unit, configured to receive uplink control information sent by a terminal device by using an uplink control channel, where the uplink control channel occupies N symbols, N is a positive integer, a signal carried on a symbol l of the N symbols is directly proportional to a product of a first sequence and a second sequence, and the second sequence is a cyclic shift sequence; and a processing unit, configured to determine the first sequence according to an information bit quantity of the uplink control information and the second sequence, where the first sequence is a linear-phase complex exponential sequence, where the processing unit is further configured to determine an information bit sequence of the uplink control information according to the first sequence.

With reference to the sixth aspect, in a second possible implementation, that the processing unit determines an information bit sequence of the uplink control information according to the first sequence includes: determining, by the processing unit according to the information bit quantity of the uplink control information, a bit quantity of a second bit sequence carried on the symbol l; determining, by the processing unit according to the first sequence and the bit quantity of the second bit sequence carried on the symbol l, the second bit sequence carried on the symbol l; and determining, by the processing unit, the information bit sequence of the uplink control information according to the second bit sequence carried on the symbol l, where the determining, by the processing unit according to the first sequence and the bit quantity of the second bit sequence carried on the symbol l, the second bit sequence carried on the symbol l includes: when the bit quantity of the second bit sequence carried on the symbol l is 1, if the first sequence is {1,1,1,1,1,1,1,1,1,1,1,1}, the second bit sequence carried on the symbol l is 0; or if the first sequence is {1,−1,1,−1, 1,−1,1,−1,1,−1,1,−1}, the second bit sequence carried on the symbol l is 1; or when the bit quantity of the second bit sequence carried on the symbol l is 2, if the first sequence is {1,1,1,1,1,1,1,1,1,1,1,1}, the second bit sequence carried on the symbol l is 00; if the first sequence is {1, −j,1,−1, 1,−j,1,−1,1,−j,1,−1}, the second bit sequence carried on the symbol l is 01; if the first sequence is {1,−1,1,−1,1,−1, 1,−1,1,−1,1,−1}, the second bit sequence carried on the symbol l is 10; or if the first sequence is {1,j,−1, −j,1,j,−1, −j,1,j,−1, −j}, the second bit sequence carried on the symbol l is 11.

With reference to the sixth aspect, in a third possible implementation, that the processing unit determines an information bit sequence of the uplink control information according to the first sequence includes: determining, by the processing unit, the information bit sequence of the uplink control information according to the first sequence and the bit quantity of the uplink control information, where the determining includes: when the bit quantity of the uplink control information is 1, if the first sequence is {1,1,1,1,1, 1,1,1,1,1,1,1}, a second bit sequence carried on the symbol l is 0; or if the first sequence is {1,−1,1,−1,1,−1,1,−1,1,−1, 1,−1}, a second bit sequence carried on the symbol l is 1; or when the bit quantity of the uplink control information is 2, if the first sequence is {1,1,1,1,1,1,1,1,1,1,1,1}, a second bit sequence carried on the symbol l is 00; if the first sequence is {1, −j,1,−1,1,−j,1,−1,1,−j,1,−1}, a second bit sequence carried on the symbol l is 01; if the first sequence is {1,−1,1,−1,1,−1,1,−1,1,−1,1,−1}, a second bit sequence carried on the symbol l is 10; or if the first sequence is {1,j,−1, −j,1,j,−1, −j,1,j,−1, −j}, a second bit sequence carried on the symbol l is 11.

With reference to any one of the sixth aspect to the third possible implementation, in a fourth possible implementation, the second sequence is a Zadoff-Chu sequence, or a sequence obtained from a Zadoff-Chu sequence by means of cyclic extension or truncation.

With reference to any one of the sixth aspect to the fourth possible implementation, in a sixth possible implementation, the symbol quantity N of the uplink control channel is less than a quantity of symbols included in one subframe.

According to a seventh aspect of the present disclosure, a terminal device is provided, including a processing unit, configured to determine an information bit sequence of to-be-transmitted uplink control information, where the processing unit is further configured to determine, according to the information bit sequence, a second bit sequence carried on a symbol l of an uplink control channel, where the uplink control channel occupies N symbols, N is a positive integer, l is an integer, and l=0, 1, . . . , N−1; and the processing unit is further configured to determine, according to a status value of the second bit sequence, a cyclic shift of a third sequence corresponding to the symbol l, and determine, according to the cyclic shift, the third sequence corresponding to the symbol l; and a sending unit, configured to map the third sequence corresponding to the symbol l onto the symbol l of the uplink control channel, and send the third sequence to a base station.

With reference to the seventh aspect, in a first possible implementation, that the processing unit determines, according to the information bit sequence, a second bit sequence carried on a symbol l of an uplink control channel includes: determining, by the processing unit, a first bit sequence according to the information bit sequence and the quantity N of symbols occupied by the uplink control channel, where a bit quantity of the first bit sequence is N or 2N; and determining, by the processing unit according to the first bit sequence, the second bit sequence carried on the symbol l of the uplink control channel, where the second bit sequence carried on the symbol l is a part, carried on the symbol l, of the first bit sequence.

With reference to the first possible implementation of the seventh aspect, in a second possible implementation, a bit quantity of the information bit sequence is 1, and the processing unit determines that the bit quantity of the first bit sequence is N, and that the first bit sequence is obtained by cyclically repeating the information bit sequence for N times.

With reference to the first possible implementation of the seventh aspect, in a third possible implementation, a bit quantity of the information bit sequence is 2, and the processing unit determines that the bit quantity of the first bit sequence is 2N, and that the first bit sequence is obtained by cyclically repeating the information bit sequence for N times.

With reference to the first possible implementation of the seventh aspect, in a fourth possible implementation, a bit quantity of the information bit sequence is greater than or equal to 3 and less than or equal to 2N, and the processing unit determines that the bit quantity of the first bit sequence is 2N, and that the first bit sequence is obtained from the information bit sequence by means of Reed-Muller coding.

With reference to any one of the seventh aspect to the fourth possible implementation, in a fifth possible implementation, status values of the second bit sequence are in a one-to-one correspondence to a plurality of cyclic shifts of the third sequence, the status value of the second bit sequence is one of M status values, the M status values are in a one-to-one correspondence to M cyclic shifts, M is 2 raised to the power of $M_1$, $M_1$ is a bit quantity of the second bit sequence, and both M and $M_1$ are positive integers.

With reference to the fifth possible implementation of the seventh aspect, in a sixth possible implementation, an interval of cyclic shifts corresponding to any two of the M status values is greater than or equal to 2.

With reference to any one of the seventh aspect to the sixth possible implementation, in a seventh possible implementation, the third sequence is a Zadoff-Chu sequence, or a sequence obtained from a Zadoff-Chu sequence by means of cyclic extension or truncation.

With reference to any one of the seventh aspect to the seventh possible implementation, in an eighth possible implementation, the symbol quantity N of the uplink control channel is less than a quantity of symbols included in one subframe.

According to an eighth aspect of the present disclosure, a base station is provided, including a receiving unit, configured to receive uplink control information sent by a terminal device by using an uplink control channel, where the uplink control channel occupies N symbols, N is a positive integer, a signal carried on a symbol l of the N symbols is corresponding to a third sequence, the third sequence is a cyclic shift sequence, l is an integer, and l=0, 1, . . . , N−1; and a processing unit, configured to determine, according to an information bit quantity of the uplink control information, the third sequence corresponding to the signal carried on the symbol l, where the processing unit is further configured to determine an information bit sequence of the uplink control information according to the third sequence corresponding to the signal carried on the symbol l.

With reference to the eighth aspect, in a first possible implementation, that the base station determines an information bit sequence of the uplink control information according to the third sequence corresponding to the signal carried on the symbol l further includes: determining, by the processing unit according to the third sequence corresponding to the signal carried on the symbol l, a second bit sequence carried on the symbol l; and determining the information bit sequence of the uplink control information according to the second bit sequence carried on the symbol l.

With reference to the first possible implementation of the eighth aspect, in a second possible implementation, the determining, by the processing unit, according to the third sequence corresponding to the signal carried on the symbol l, a second bit sequence carried on the symbol l includes: determining, by the processing unit according to a cyclic shift of the third sequence corresponding to the signal carried on the symbol l, the second bit sequence carried on the symbol l, where the cyclic shift of the third sequence is corresponding to a status value of the second bit sequence, the cyclic shift of the third sequence is one of M cyclic shifts, the M cyclic shifts are in a one-to-one correspondence to M status values, M is 2 raised to the power of $M_1$, $M_1$ is a bit quantity of the second bit sequence, and both M and $M_1$ are positive integers.

With reference to the second possible implementation of the eighth aspect, in a third possible implementation, an interval of cyclic shifts corresponding to any two of the M status values is greater than or equal to 2.

With reference to any one of the eighth aspect to the third possible implementation, in a fourth possible implementation, the third sequence is a Zadoff-Chu sequence, or a sequence obtained from a Zadoff-Chu sequence by means of cyclic extension or truncation.

With reference to any one of the eighth aspect to the fourth possible implementation, in a fifth possible implementation, the symbol quantity N of the uplink control channel is less than a quantity of symbols included in one subframe.

According to a ninth aspect of the present disclosure, a system is provided, including: a terminal device, configured to determine an information bit sequence of to-be-transmitted uplink control information, and determine a first sequence according to the information bit sequence, where the first sequence is a linear-phase complex exponential sequence, where the terminal device is further configured to send the to-be-transmitted uplink control information to a base station by using an uplink control channel, where the uplink control channel occupies N symbols, N is a positive integer, a signal carried on a symbol l of the N symbols is directly proportional to a product of the first sequence and a second sequence, and the second sequence is a cyclic shift sequence; and the base station, configured to receive the uplink control information that is sent by the terminal device by using the uplink control channel, where the base station is further configured to determine the first sequence according to an information bit quantity of the uplink control information and the second sequence, and determine the information bit sequence according to the first sequence.

According to a tenth aspect of the present disclosure, a system is provided, including: a terminal device, configured to determine an information bit sequence of to-be-transmitted uplink control information, and determine, according to the information bit sequence, a second bit sequence carried on a symbol l of an uplink control channel, where the uplink control channel occupies N symbols, N is a positive integer, l is an integer, and l=0, 1, . . . , N−1, where the terminal device is further configured to determine, according to a status value of the second bit sequence, a cyclic shift of a third sequence corresponding to the symbol l, and determine, according to the cyclic shift, the third sequence corresponding to the symbol l; and the terminal device is further configured to map the third sequence corresponding to the symbol l onto the symbol l of the uplink control channel, and send the third sequence to a base station; and the base station, configured to receive the uplink control information that is sent by the terminal device by using the uplink control channel, where the base station is further configured to determine, according to an information bit quantity of the uplink control information, the third sequence corresponding to the signal carried on the symbol l, and determine the information bit sequence according to the third sequence corresponding to the signal carried on the symbol l.

In the embodiments of the present disclosure, a new uplink control channel is defined, so as to resolve a technical problem that an existing PUCCH cannot support uplink control information transmission performed in less than one subframe. This implements flexible uplink control information transmission and improves transmission performance.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as a GSM system, a Code Division Multiple Access (CDMA) system, a Wideband Code Division Multiple Access (WCDMA) system, a general packet radio service (GPRS) system, and a Long Term Evolution (LTE) system.

A terminal device, also referred to as user equipment, a mobile terminal, a mobile terminal device, or the like, may communicate with one or more core networks by using a radio access network (RAN). The terminal device may be a mobile terminal, such as a mobile phone (or referred to as a "cellular" phone) and a computer with a mobile terminal. For example, the terminal device may be a portable, pocket-sized, handheld, computer built-in, or in-vehicle mobile apparatus, which exchanges voice and/or data with the radio access network.

A base station may be a base station (BTS, Base Transceiver Station) in GSM or CDMA, may be a base station (NodeB) in WCDMA, or may be an evolved NodeB (eNB or e-NodeB) in LTE. This is not limited in the present disclosure.

Figure 1:
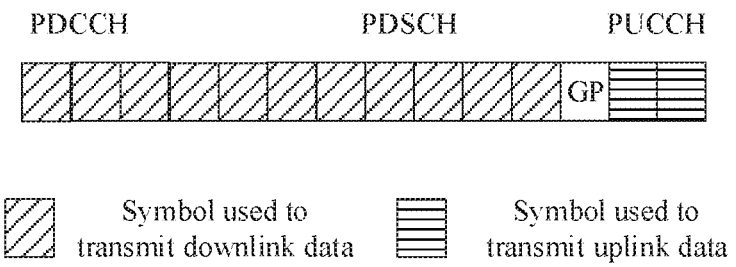
FIG. 1 is a schematic diagram of a new subframe type.
Figure 2:
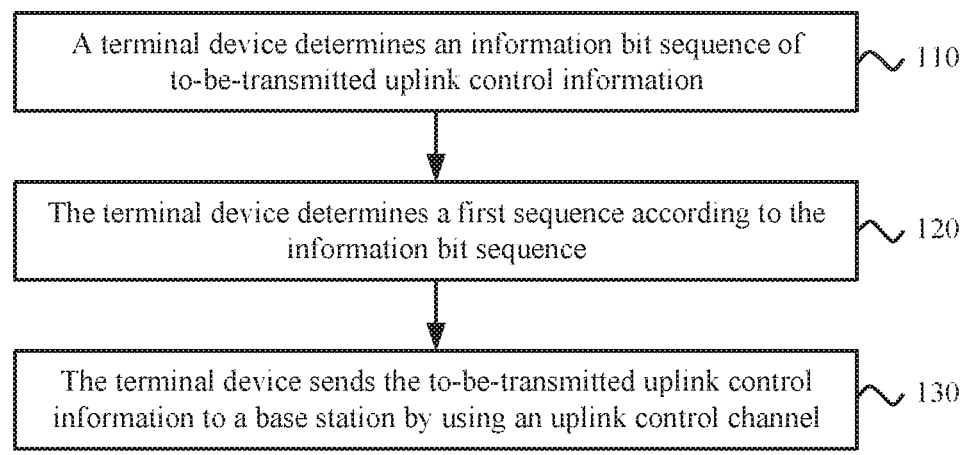
FIG. 2 is a schematic flowchart of an uplink control information transmission method according to an embodiment of the present disclosure.

FIG. 2 is a schematic flowchart of an uplink control information transmission method according to an embodiment of the present disclosure. The method in FIG. 2 may be executed by a terminal device.

Step 110: The terminal device determines an information bit sequence of to-be-transmitted uplink control information.

In this step, the terminal device determines the to-be-transmitted uplink control information. For example, the uplink control information may be a hybrid automatic repeat request-acknowledgment HARQ-ACK, channel state information CSI, a scheduling request (SR), or the like.

In this step, that the terminal device determines the to-be-transmitted uplink control information may include the following steps.

Step 110-1: The terminal device determines an information bit quantity of the to-be-transmitted uplink control information.

In step 110-1, the terminal device may determine the information bit quantity of the to-be-transmitted uplink control information according to factors such as a quantity of carriers configured by the terminal device and a transmission mode of each carrier. Optionally, the information bit quantity may be equal to a product of the quantity of carriers and a quantity of codewords supported by each carrier.

For example, if the terminal device configures one carrier, and a transmission mode corresponding to the carrier supports only single-codeword transmission, the determined information bit quantity of the to-be-transmitted uplink control information is 1. For another example, if the terminal device configures two carriers, and a transmission mode corresponding to each carrier supports only single-codeword transmission, the determined information bit quantity of the to-be-transmitted uplink control information is 2. For another example, if the terminal device configures one carrier, and a transmission mode corresponding to the carrier supports dual-codeword transmission, the determined information bit quantity of the to-be-transmitted uplink control information is 1, and so on.

Step 110-2: The terminal device determines, according to the information bit quantity, the information bit sequence corresponding to the to-be-transmitted uplink control information. Optionally, an uplink control channel in this embodiment of the present disclosure may be a physical uplink control channel PUCCH or another uplink control channel.

In step 110-2, the terminal device determines the information bit sequence corresponding to the to-be-transmitted uplink control information. For example, when the information bit quantity of the to-be-transmitted uplink control information is 1, the terminal device determines whether the information bit sequence corresponding to the to-be-transmitted uplink control information is 0 or 1; or when the information bit quantity of the to-be-transmitted uplink control information is 2, the terminal device determines whether the information bit sequence corresponding to the to-be-transmitted uplink control information is 00, 01, 10, or 11.

Optionally, the information bit sequence corresponding to the to-be-transmitted uplink control information is related to content of the uplink control information. For example, when the to-be-transmitted uplink control information is a HARQ-ACK, the terminal device may determine, according to a status of the HARQ-ACK, the information bit sequence corresponding to the to-be-transmitted uplink control information. The status of the HARQ-ACK may include an ACK, a NACK, and/or a DTX.

Step 120: The terminal device determines a first sequence according to the information bit sequence determined in step 110, where the first sequence is a linear-phase complex exponential sequence.

Optionally, the terminal device determines that the uplink control channel occupies N symbols, where N is a positive integer. The first sequence is corresponding to a signal carried on a symbol l of the N symbols. Optionally, the symbol l may be any one of the N symbols, that is, l=0, 1, ..., N−1. In this case, l is a symbol number, and the symbol number is a number corresponding to one of the N symbols. The symbol number may be different from a number of the symbol l in a subframe. Alternatively, the symbol l may be one of the N symbols. In this case, the terminal device needs to determine, according to the information bit sequence, a first sequence corresponding to each of the N symbols.

Optionally, in this embodiment of the present disclosure, a signal carried on a symbol may include a sequence corresponding to the signal.

Step 120 may include the following steps.

In step 120-1, the terminal device determines a first bit sequence according to the information bit sequence and the symbol quantity N of the uplink control channel, where a bit quantity of the first bit sequence is N or 2N.

Step 120-1 may include the following cases.

Case 1: When a bit quantity of the to-be-transmitted information bit sequence is 1, the terminal device determines that the bit quantity of the first bit sequence is N, and that the first bit sequence is obtained by cyclically repeating the information bit sequence for N times.

For example, the to-be-transmitted information bit sequence is 1, the symbol quantity corresponding to the uplink control channel is 2, and the bit quantity of the first bit sequence needs to be equal to the symbol quantity corresponding to the uplink control channel, that is, 2. Therefore, the first bit sequence is {1,1}.

For another example, the to-be-transmitted information bit sequence is 0, the symbol quantity corresponding to the uplink control channel is 3, and the bit quantity of the first bit sequence needs to be equal to the symbol quantity corresponding to the uplink control channel, that is, 3. Therefore, the first bit sequence is {0, 0, 0}.

Case 2: When a bit quantity of the to-be-transmitted information bit sequence is 2, and the terminal device determines that the bit quantity of the first bit sequence is 2N, and that the first bit sequence is obtained by cyclically repeating the information bit sequence for N times.

For example, the to-be-transmitted information bit sequence is {1,0}, the symbol quantity corresponding to the uplink control channel is 2, and the bit quantity of the first bit sequence needs to be twice the symbol quantity corresponding to the uplink control channel, that is, 4. Therefore, the first bit sequence is {1,0,1,0}.

For another example, the to-be-transmitted information bit sequence is {0,0}, the symbol quantity corresponding to the uplink control channel is 1, and the bit quantity of the first bit sequence needs to be twice the symbol quantity corresponding to the uplink control channel, that is, 2. Therefore, the first bit sequence is {0,0}.

Case 3: When the information bit quantity of the to-be-transmitted uplink control information is greater than or equal to 3 and less than or equal to 2N, the terminal device determines that the bit quantity of the first bit sequence is 2N, and that the first bit sequence is obtained from the information bit sequence by means of Reed-Muller (RM) coding.

For example, the to-be-transmitted information bit sequence has three bits, the symbol quantity corresponding to the uplink control channel is 2, and the bit quantity of the first bit sequence needs to be twice the symbol quantity corresponding to the uplink control channel, that is, 4. The terminal device may code the 3-bit information bit sequence into a 4-bit first bit sequence by means of RM coding.

In conclusion, by performing step 120-1, the terminal device determines the first bit sequence according to the information bit sequence and the symbol quantity N of the uplink control channel.

In step 120-2, the terminal device determines, according to the first bit sequence, a second bit sequence carried on the symbol l, where the second bit sequence is a part, carried on the symbol l, of the first bit sequence.

As described above, the uplink control channel occupies the N symbols. When the first bit sequence has N bits, each symbol carries one bit; or when the first bit sequence has 2N bits, each symbol carries two bits.

Optionally, in this embodiment of the present disclosure, a symbol carries a maximum of two bits.

During uplink control information transmission, if a symbol carries two bits, intersymbol power accumulation can be better utilized to improve uplink control information performance. For example, if N is 2, compared with a manner in which each of two information bits is mapped onto one of two symbols for transmission, approximately 3 dB gains can be obtained by means of intersymbol power accumulation in this embodiment of the present disclosure.

When the bit quantity of the first bit sequence is the same as the symbol quantity corresponding to the uplink control channel, or when the bit quantity of the first bit sequence is N, the second bit sequence carried on the symbol l is an $(l+1)^{th}$ bit of the first bit sequence. For example, when the first bit sequence is {1,1}, the symbol quantity corresponding to the uplink control channel is 2, the second bit sequence carried on a symbol 0 is 1, and the second bit sequence carried on a symbol 1 is also 1.

When the bit quantity of the first bit sequence is twice the symbol quantity corresponding to the uplink control channel, or when the bit quantity of the first bit sequence is 2N, the second bit sequence carried on the symbol l includes a $2l^{th}$ bit and a $(2l+1)^{th}$ bit of the first bit sequence. For example, when the first bit sequence is {1,0,1,0} the symbol quantity corresponding to the uplink control channel is 2, the second bit sequence carried on a symbol 0 is {1,0}, and the second bit sequence carried on a symbol 1 is {1,0}.

By performing step 120-2, the terminal device may determine, according to the first bit sequence, the second bit sequence carried on the symbol l.

In step 120-3, the terminal device determines the corresponding first sequence according to the second bit sequence carried on the symbol l.

Optionally, the terminal device may determine, by means of calculation and/or search, the corresponding first sequence according to the second bit sequence.

It should be noted that, in all the embodiments of the present disclosure, the first sequence is a linear-phase complex exponential sequence. Optionally, the terminal device may calculate the first sequence according to the second bit sequence by using the following method. The first sequence may be $e^{(-j2\pi/M)*i*a}$ or $e^{(+j2\pi/M)*i*a}$. e is a natural base. j is an imaginary unit. M is 2 raised to the power of $M_1$, where $M_1$ is a bit quantity of the second bit sequence. For example, when the bit quantity of the second bit sequence is 1, M=2; or when the bit quantity of the second bit sequence is 2, M=4. a=0, 1, ..., M−1. Optionally, different values of a are corresponding to different status values. For example, when the bit quantity of the second bit sequence is 1, if the second bit sequence is 0, a takes a value of 0; or if the second bit sequence is 1, a takes a value of 1. i=0, 1, ..., 11.

Optionally, the terminal device may search for the first sequence according to the second bit sequence by using the following method in the following cases.

Case 1: When the bit quantity of the second bit sequence carried on the symbol l is 1:

Optionally, if the second bit sequence is 0, the first sequence is {1,1,1,1,1,1,1,1,1,1,1,1}; or if the second bit sequence is 1, the first sequence is {1,−1,1,−1,1,−1,1,−1,1,−1,1,−1}.

In addition, optionally, if the second bit sequence is 0, the first sequence is {1,−1,1,−1,1,−1,1,−1,1,−1,1,−1}; or if the second bit sequence is 1, the first sequence is {1,1,1,1,1,1,1,1,1,1,1,1}.

Case 2: When the bit quantity of the second bit sequence carried on the symbol l is 2:

If the second bit sequence is 00, the first sequence is {1,1,1,1,1,1,1,1,1,1,1,1}; if the second bit sequence is 01, the first sequence is {1, −j,1,−1,1,−j,1,−1,1,−j,1,−1}; if the second bit sequence is 10, the first sequence is {1,−1,1,−1, 1,−1,1,−1,1,−1,1,−1,−1}; or if the second bit sequence is 11, the first sequence is {1,j,−1, −j,1,j,−1, −j,1,j,−1, −j}.

It should be noted that, when the bit quantity of the second bit sequence is 2, a value of the second bit sequence and the first sequence are not limited to the foregoing correspondence. That is, the correspondence may vary, provided that the value of the second bit sequence is corresponding to the first sequence.

In addition, optionally, in step 120, that the terminal device determines a first sequence according to the information bit sequence may be implemented by directly searching the correspondence.

For example, when a bit quantity of the information bit sequence is 1, if the information bit sequence is 0, the first sequence is {1,1,1,1,1,1,1,1,1,1,1,1}; or if the information bit sequence is 1, the first sequence is {1,−1,1,−1,1,−1,1,−1,1,−1}; or when a bit quantity of the information bit sequence is 2, if the information bit sequence is 00, the first sequence is {1,1,1,1,1,1,1,1,1,1,1,1}; if the information bit sequence is 01, the first sequence is {1, −j,1,−1,1,−j,1,−1,1,−j,1,−1}; if the information bit sequence is 10, the first sequence is {1,−1,1,−1,1,−1,1,−1,1,−1,1,−1}; or if the information bit sequence is 11, the first sequence is {1,j,−1, −j,1,j,−1, −j,1,j,−1, −j}.

It should be understood that, a value of the information bit sequence and the first sequence are not limited to the foregoing correspondence. That is, the correspondence may vary, provided that the value of the information bit sequence is corresponding to the first sequence.

In conclusion, by performing step 120, the terminal device may determine the first sequence according to the to-be-transmitted information bit sequence. Because the first sequence is a linear-phase complex exponential sequence, a specific element in the first sequence does not change with a status of the uplink control information. For example, when the information bit quantity of the to-be-transmitted uplink control information is 1, values in even-numbered bits of the first sequence do not change with the information bit sequence corresponding to the to-be-transmitted uplink control information. Therefore, the values in the even-numbered bits of the first sequence may be used as reference signals, and a base station can obtain a channel characteristic of a radio channel according to these reference signals. This improves transmission reliability of the uplink control information.

In addition, in this embodiment of the present disclosure, a characteristic of mutual orthogonality between first sequences corresponding to different information bit sequences is effectively used, so that an increase in the information bit quantity has relatively small impact on performance. For example, when a case in which one symbol carries 1-bit information is compared with a case in which one symbol carries 2-bit information, a performance loss is within 1 dB. Therefore, compared with the case in which each of two information bits is mapped onto one of two symbols for transmission, approximately 2 dB gains can be obtained in manner 1.

Step 130: The terminal device sends the to-be-transmitted uplink control information to a base station by using an uplink control channel, where the uplink control channel occupies N symbols, and N is a positive integer. A signal carried on a symbol l of the N symbols is directly proportional to a product of the first sequence and a second sequence, and the second sequence is a cyclic shift sequence.

Optionally, that a signal carried on a symbol l of the N symbols is directly proportional to a product of the first sequence and a second sequence may be that a sequence corresponding to the signal carried on the symbol l of the N symbols is equal to the product of the first sequence and the second sequence, that is, a direct proportional factor is 1; or a sequence corresponding to the signal carried on the symbol l of the N symbols may be k times the product of the first sequence and the second sequence, and k is an adjustment factor.

Optionally, that a signal carried on a symbol l is directly proportional to a product of the first sequence and a second sequence means that any element in a sequence corresponding to the signal carried on the symbol l is directly proportional to a product of corresponding elements in the first sequence and the second sequence. Optionally, lengths of the sequence corresponding to the signal carried on the symbol l, the first sequence, and the second sequence are the same.

Optionally, the second sequence is a Zadoff-Chu sequence, or a sequence obtained from a Zadoff-Chu sequence by means of cyclic extension or truncation. A single-carrier characteristic of the uplink control information can be maintained by using the second sequence to carry the uplink control information.

Optionally, in all the embodiments of the present disclosure, a symbol may be a single carrier frequency division multiple access (SC-FDMA) symbol, or may be a time-domain symbol such as an OFDM symbol.

Optionally, the symbol quantity N of the uplink control channel is less than a quantity of symbols included in one subframe. Optionally, N may be greater than 1, so as to meet a requirement of a scenario in which a relatively large quantity of bits of uplink control information need to be transmitted or relatively large uplink control channel coverage is required. N may be less than the symbol quantity of one subframe, so that the uplink control information can be transmitted on a relatively small quantity of symbols.

Figure 3:
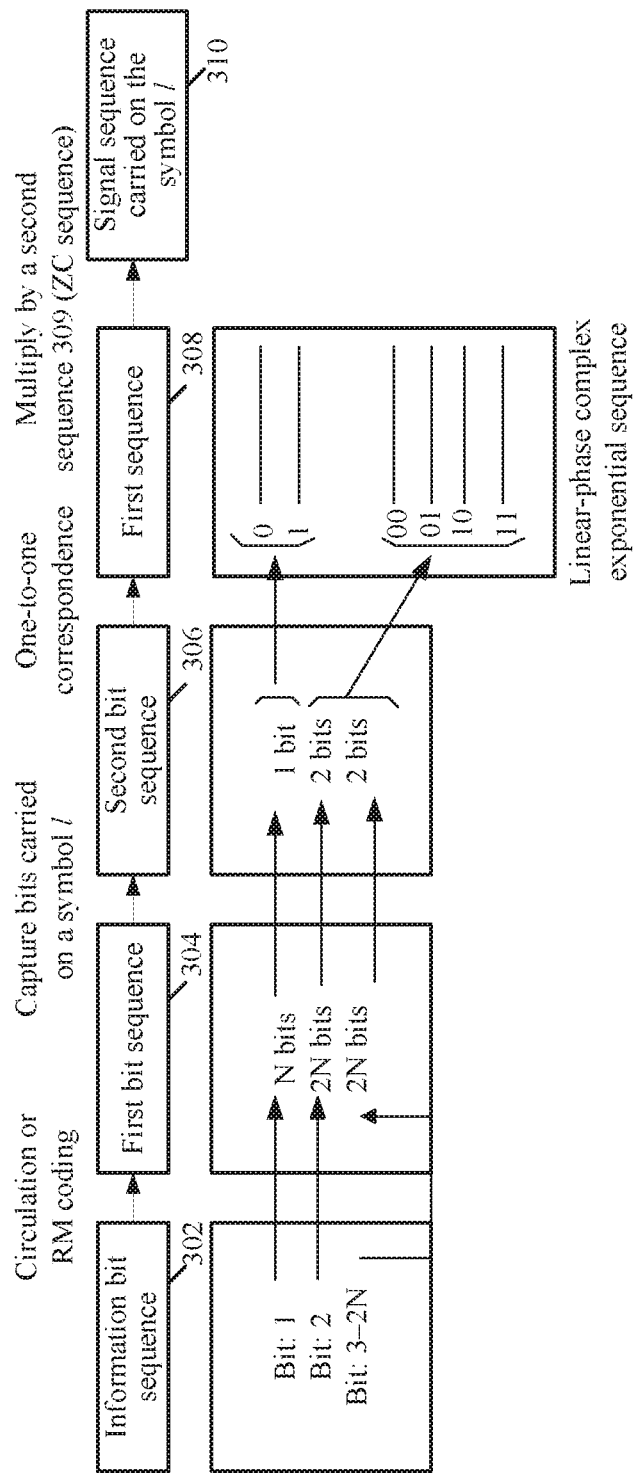
FIG. 3 is a schematic flowchart of an uplink control information transmission method according to an embodiment of the present disclosure.

FIG. 3 is a schematic flowchart of a method for generating a signal carried on a symbol l of an uplink control channel according to an embodiment of the present disclosure. FIG. 3 shows a procedure for generating, according to an information bit sequence 302, a signal 310 carried on the symbol l of the uplink control channel. The method in FIG. 3 may be executed by a terminal device.

As shown in FIG. 3, the terminal device determines to-be-transmitted uplink control information. Optionally, the terminal device determines the information bit sequence 302 of the uplink control information.

Then, the terminal device sends the to-be-transmitted uplink control information by using the uplink control channel. The uplink control channel occupies N symbols, and N is a positive integer. The signal carried on the symbol l of the N symbols is corresponding to a product of a second sequence 309 and a first sequence 308. The second sequence 309 is a cyclic shift sequence. The first sequence 308 is a linear-phase complex exponential sequence, and is determined according to a second bit sequence 306 carried on the symbol l.

Optionally, if a bit quantity of the information bit sequence 302 of the to-be-transmitted uplink control information is 1, a bit quantity of the second bit sequence 306 carried on the symbol l is 1, and a bit quantity of a first bit sequence 304 carried on the N symbols is N. The second bit sequence 306 is a part of the first bit sequence 304, and the first bit sequence 304 is obtained by cyclically repeating the information bit sequence corresponding to the to-be-transmitted uplink control information.

Optionally, if a bit quantity of the information bit sequence 302 of the to-be-transmitted uplink control information is 2, a bit quantity of the second bit sequence 306 carried on the symbol l is 2, and a bit quantity of a first bit sequence carried on the N symbols is 2N. The second bit sequence 306 is a part of the first bit sequence 304, and the first bit sequence 304 is obtained by cyclically repeating the information bit sequence corresponding to the to-be-transmitted uplink control information.

Optionally, if a bit quantity of the information bit sequence 302 of the to-be-transmitted uplink control information is greater than or equal to 3 and less than or equal to 2N, a bit quantity of the second bit sequence 306 carried on the symbol l is 2, and a bit quantity of a first bit sequence 304 carried on the N symbols is 2N. The second bit sequence 306 is a part of the first bit sequence 304, and the first bit sequence 304 is obtained, by means of Reed-Muller RM coding, from the information bit sequence corresponding to the to-be-transmitted uplink control information.

In conclusion, according to the uplink control information transmission method provided in this embodiment of the present disclosure, the uplink control information is transmitted by using the uplink control channel that occupies N symbols, where N may be less than the symbol quantity of one subframe, for example, N is 2. This implements uplink control information transmission on a relatively small quantity of symbols. In addition, in the uplink control information transmission method, a linear complex exponential sequence is introduced, so that in a sequence corresponding to the sent uplink control information, some bits do not change with the information bit sequence corresponding to the uplink control information. Therefore, the bits can be used as reference signals, and the base station can obtain a channel characteristic of a radio channel according to these reference signals. This improves transmission reliability of the uplink control information.

Moreover, in the transmission method, a quantity of bits carried on each symbol of the uplink control channel is controlled to be not greater than 2. Therefore, when each symbol carries 2-bit information, intersymbol power accumulation can be effectively used to improve uplink control information performance, so as to obtain a transmission gain. In addition, a characteristic of mutual orthogonality between linear complex exponential sequences corresponding to different information bit sequences is effectively used, so as to obtain an additional transmission gain.

Figure 4:
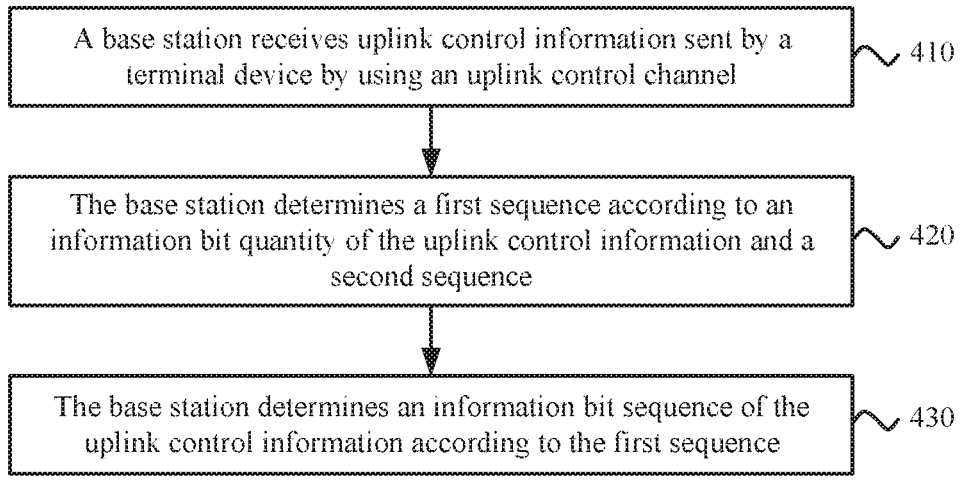
FIG. 4 is a schematic flowchart of an uplink control information transmission method according to an embodiment of the present disclosure.

FIG. 4 is a schematic flowchart of an uplink control information transmission method according to another embodiment of the present disclosure. The method in FIG. 4 is executed by a base station.

Step 410: The base station receives uplink control information sent by a terminal device by using an uplink control channel, where the uplink control channel occupies N symbols, N is a positive integer, a signal carried on a symbol l of the N symbols is directly proportional to a product of a first sequence and a second sequence, and the second sequence is a cyclic shift sequence. Optionally, the second sequence is a Zadoff-Chu sequence, or a sequence obtained from a Zadoff-Chu sequence by means of cyclic extension or truncation.

Optionally, the first sequence, the second sequence, a first bit sequence, a second bit sequence, and the signal carried on the symbol l of the N symbols in this embodiment are the same as those described in FIG. 2. Details are not repeated herein.

Step 420: The base station determines the first sequence according to an information bit quantity of the uplink control information and the second sequence, where the first sequence is a linear-phase complex exponential sequence.

Optionally, the base station determines a candidate set of the first sequence according to the information bit quantity, then performs maximum likelihood by using each sequence in the candidate set, and finally determines the first sequence sent by the terminal device.

Step 430: The base station determines an information bit sequence of the uplink control information according to the first sequence.

Optionally, step 430 may include the following steps:

Step 430-1: The base station determines, according to the information bit quantity of the uplink control information, a bit quantity of a second bit sequence carried on the symbol l.

Step 430-2: The base station determines, according to the first sequence and the bit quantity of the second bit sequence carried on the symbol l, the second bit sequence carried on the symbol l.

Optionally, step 430-2 may include the following cases:

Case 1: When the bit quantity of the second bit sequence carried on the symbol l is 1, if the first sequence is {1,1,1, 1,1,1,1,1,1,1,1,1}, the second bit sequence carried on the symbol l is 0; or if the first sequence is {1,-1,1,-1,1,-1,1,- 1,1,-1,1,-1}, the second bit sequence carried on the symbol l is 1.

Case 2: When the bit quantity of the second bit sequence carried on the symbol l is 2, if the first sequence is {1,1,1, 1,1,1,1,1,1,1,1,1}, the second bit sequence carried on the symbol l is 00; if the first sequence is {1, -j,1,-1,1,-j,1,- 1,1,-j,1,-1}, the second bit sequence carried on the symbol l is 01; if the first sequence is {1,-1,1,-1,1,-1,1,-1,1,-1,1,- 1}, the second bit sequence carried on the symbol l is 10; or if the first sequence is {1,j,-1, -j,1,j,-1, -j,1,j,-1, -j}, the second bit sequence carried on the symbol l is 11.

It should be understood that, a value of the information bit sequence and the second bit sequence are not limited to the foregoing correspondence. That is, the correspondence may vary, provided that the value of the information bit sequence is corresponding to the second bit sequence.

Optionally, in step 430, that the base station determines the information bit sequence of the uplink control information according to the first sequence and the bit quantity of the uplink control information may include:

when the bit quantity of the uplink control information is 1, if the first sequence is {1,1,1,1,1,1,1,1,1,1,1,1}, the second bit sequence carried on the symbol l is 0; or if the first sequence is {1,-1,1,-1,1,-1,1,-1,1,-1,1,-1}, the second bit sequence carried on the symbol l is 1; or when the bit quantity of the uplink control information is 2, if the first sequence is {1,1,1,1,1,1,1,1,1,1,1,1}, the second bit sequence carried on the symbol l is 00; if the first sequence is {1, -j,1,-1,1,-j,1,-1,1,-j,1,-1}, the second bit sequence carried on the symbol l is 01; if the first sequence is {1,-1,1,-1,1,-1,1,-1,1,-1,1,-1}, the second bit sequence carried on the symbol l is 10; or if the first sequence is {1,j,-1, -j,1,j,-1, -j,1,j,-1, -j}, the second bit sequence carried on the symbol l is 11.

It should be understood that, a value of the information bit sequence and the first sequence are not limited to the foregoing correspondence. That is, the correspondence may vary, provided that the value of the information bit sequence is corresponding to the first sequence.

Optionally, the symbol quantity N of the uplink control channel is less than a quantity of symbols included in one subframe.

Optionally, the uplink control information transmission method implemented by the base station may also be described with reference to FIG. 3.

First, the base station determines to-be-detected uplink control information. Optionally, the base station may determine an information bit quantity of the to-be-detected uplink control information. That is, the base station may determine the information bit quantity of the to-be-detected uplink control information according to factors such as a quantity of carriers configured by a terminal device and a transmission mode of each carrier. Optionally, the information bit quantity may be equal to a product of the quantity of carriers and a quantity of codewords supported by each carrier. This step has been described in step 110-1 in FIG. 2, and details are not repeated herein.

Then, the base station detects the to-be-detected uplink control information on an uplink control channel. The uplink control channel occupies N symbols, and N is a positive integer. A signal carried on a symbol l of the N symbols is corresponding to a product of a second sequence 309 and a first sequence 308. The second sequence 309 is a cyclic shift sequence. The first sequence 308 is a linear-phase complex exponential sequence, and is determined according to a second bit sequence 306 carried on the symbol l.

If the information bit quantity of the to-be-detected uplink control information is 1, a bit quantity of the second bit sequence 306 carried on the symbol l is 1, and a bit quantity of a first bit sequence carried on the N symbols is N. The second bit sequence 306 is a part of the first bit sequence, and the first bit sequence is obtained by cyclically repeating a candidate information bit sequence corresponding to the to-be-detected uplink control information.

If the information bit quantity of the to-be-detected uplink control information is 2, a bit quantity of the second bit sequence 306 carried on the symbol l is 2, and a bit quantity of a first bit sequence carried on the N symbols is 2N. The second bit sequence 306 is a part of the first bit sequence, and the first bit sequence is obtained by cyclically repeating a candidate information bit sequence corresponding to the to-be-detected uplink control information.

If the information bit quantity of the to-be-detected uplink control information is greater than or equal to 3 and less than or equal to 2N, a bit quantity of the second bit sequence 306 carried on the symbol l is 2, and a bit quantity of a first bit sequence carried on the N symbols is 2N. The second bit sequence 306 is a part of the first bit sequence 304, and the first bit sequence 304 is obtained, by means of Reed-Muller RM coding, from a candidate information bit sequence corresponding to the to-be-detected uplink control information.

In conclusion, according to the uplink control information transmission method provided in this embodiment of the present disclosure, the base station transmits the uplink control information by using the uplink control channel that occupies N symbols, where N may be less than a symbol quantity of one subframe, for example, N is 2. This implements uplink control information transmission on a relatively small quantity of symbols. In addition, in the uplink control information transmission method, a linear complex exponential sequence is introduced, so that in a sequence corresponding to the sent uplink control information, some bits do not change with the information bit sequence corresponding to the uplink control information. Therefore, the bits can be used as reference signals, and the base station can obtain a channel characteristic of a radio channel according to these reference signals. This improves transmission reliability of the uplink control information.

Figure 5:
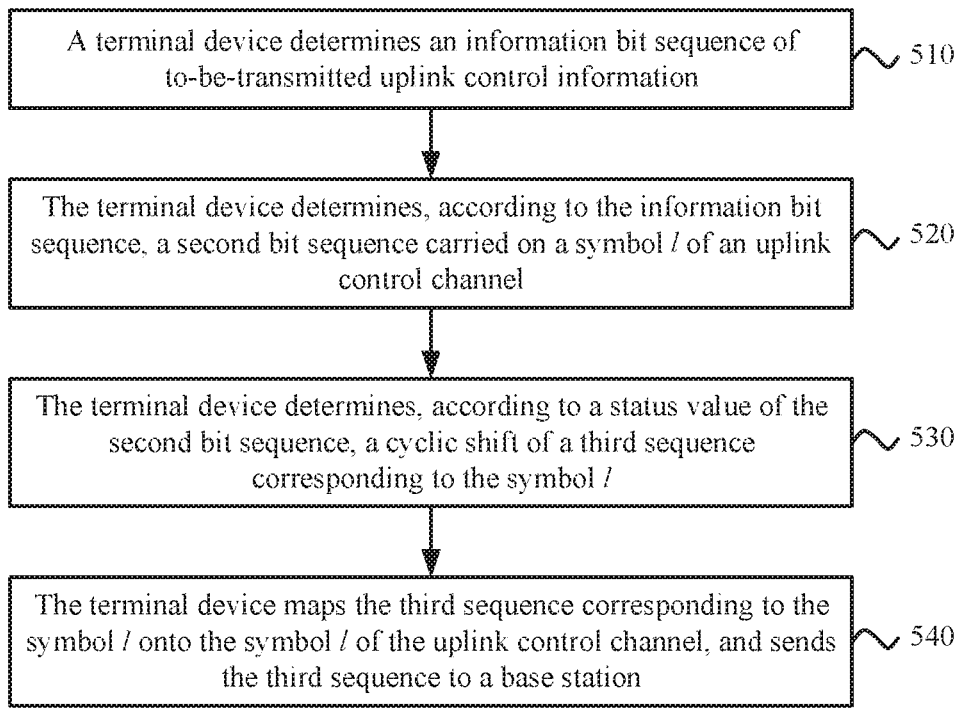
FIG. 5 is a schematic flowchart of an uplink control information transmission method according to an embodiment of the present disclosure.

FIG. 5 is a schematic flowchart of an uplink control information transmission method according to an embodiment of the present disclosure. The method in FIG. 5 may be executed by a terminal device.

Step 510: The terminal device determines an information bit sequence of to-be-transmitted uplink control information. This step has been described in step 110 in FIG. 2, and details are not repeated herein.

Step 520: The terminal device determines, according to the information bit sequence, a second bit sequence carried on a symbol l of an uplink control channel, where the uplink control channel occupies N symbols, N is a positive integer, l is an integer, and l=0, 1, . . . , N−1.

Optionally, a status value of the second bit sequence is one of M status values, where M is a positive integer. A bit quantity of the second bit sequence is 1 or 2. When the bit quantity is 1, the M status values include 0 and 1; or when the bit quantity is 2, the M status values include 00, 01, 10, and 11. Optionally, M is 2 raised to the power of $M_1$, and $M_1$ is the bit quantity of the second bit sequence. For example, when the bit quantity of the second bit sequence is 1, M is 2; or when the bit quantity of the second bit sequence is 2, M is 4.

Optionally, step 520 includes the following steps.

Step 520-1: The terminal device determines a first bit sequence according to the information bit sequence and the quantity N of symbols occupied by the uplink control channel, where a bit quantity of the first bit sequence is N or 2N.

This step includes the following cases:

Case 1: When a bit quantity of the information bit sequence is 1, the terminal device determines that the bit quantity of the first bit sequence is N, and that the first bit sequence is obtained by cyclically repeating the information bit sequence for N times.

Case 2: When a bit quantity of the information bit sequence is 2, the terminal device determines that the bit quantity of the first bit sequence is 2N, and that the first bit sequence is obtained by cyclically repeating the information bit sequence for N times.

Case 3: When a bit quantity of the information bit sequence is greater than or equal to 3 and less than or equal to 2N, the terminal device determines that the bit quantity of the first bit sequence is 2N, and that the first bit sequence is obtained from the information bit sequence by means of Reed-Muller coding.

Step 520-2: The terminal device determines, according to the first bit sequence, a second bit sequence carried on the symbol l of the uplink control channel, where the second bit sequence carried on the symbol l is a part, carried on the symbol l, of the first bit sequence.

Definitions of the first bit sequence and the second bit sequence are the same as those described in FIG. 2, and details are not repeated herein.

Step 530: The terminal device determines, according to a status value of the second bit sequence, a cyclic shift of a third sequence corresponding to the symbol l, and determines, according to the cyclic shift, the third sequence corresponding to the symbol l.

Optionally, the third sequence is a cyclic shift sequence. Further, optionally, the third sequence is a Zadoff-Chu sequence, or a sequence obtained from a Zadoff-Chu sequence by means of cyclic extension or truncation.

Optionally, the status value of the second bit sequence is one of the M status values, and the M status values are in a one-to-one correspondence to M cyclic shifts. In this step, the terminal device determines the cyclic shift of the third sequence according to the status value of the second bit sequence, and determines the third sequence according to the cyclic shift.

Optionally, the cyclic shift of the third sequence is determined according to the second bit sequence carried on the symbol l. This may specifically mean that the cyclic shift of the third sequence is determined according to the status value of the second bit sequence carried on the symbol l. Different cyclic shifts of the third sequences are used to represent different status values of the uplink control information. For example, if the second bit sequence carried on the symbol l is 0, a cyclic shift factor of the third sequence is 0; or if the second bit sequence carried on the symbol l is 1, a cyclic shift factor of the third sequence is 2. Because a single-carrier characteristic is maintained for a cyclic shift of a ZC sequence, using different cyclic shifts of the third sequence to represent different states of the uplink control information ensures a single-carrier characteristic in uplink during uplink control information transmission.

Optionally, an interval of cyclic shifts corresponding to any two of the M status values is greater than or equal to 2. For example, if the second bit sequence carried on the symbol l is 1, the cyclic shift factor of the third sequence may be 2; if the second bit sequence carried on the symbol l is 00, the cyclic shift factor of the third sequence may be 4; or if the second bit sequence carried on the symbol l is 01, the cyclic shift factor of the third sequence may be 6.

Step 540: The terminal device maps the third sequence corresponding to the symbol l onto the symbol l of the uplink control channel, and sends the third sequence to a base station.

Optionally, the symbol quantity N of the uplink control channel is less than a quantity of symbols included in one subframe. Optionally, N may be greater than 1, so as to meet a requirement of a scenario in which a relatively large quantity of bits of uplink control information need to be transmitted or relatively large uplink control channel coverage is required. N may be less than the symbol quantity of one subframe, so that the uplink control information can be transmitted on a relatively small quantity of symbols.

In conclusion, according to the uplink control information transmission method provided in this embodiment of the present disclosure, the uplink control information is transmitted by using the uplink control channel that occupies N symbols, where N may be less than the symbol quantity of one subframe, for example, N is 2. This implements uplink control information transmission on a relatively small quantity of symbols. In addition, the third sequence is a cyclic shift sequence; therefore, the single-carrier characteristic of the uplink control information can be maintained by using the sequence to carry the uplink control information.

Moreover, in the transmission method, a quantity of bits carried on each symbol of the uplink control channel is controlled to be not greater than 2. Therefore, when each symbol carries 2-bit information, intersymbol power accumulation can be effectively used to improve uplink control information performance, so as to obtain a transmission gain. In addition, a characteristic of mutual orthogonality between linear complex exponential sequences corresponding to different information bit sequences is effectively used, so as to obtain an additional transmission gain.

Figure 6:
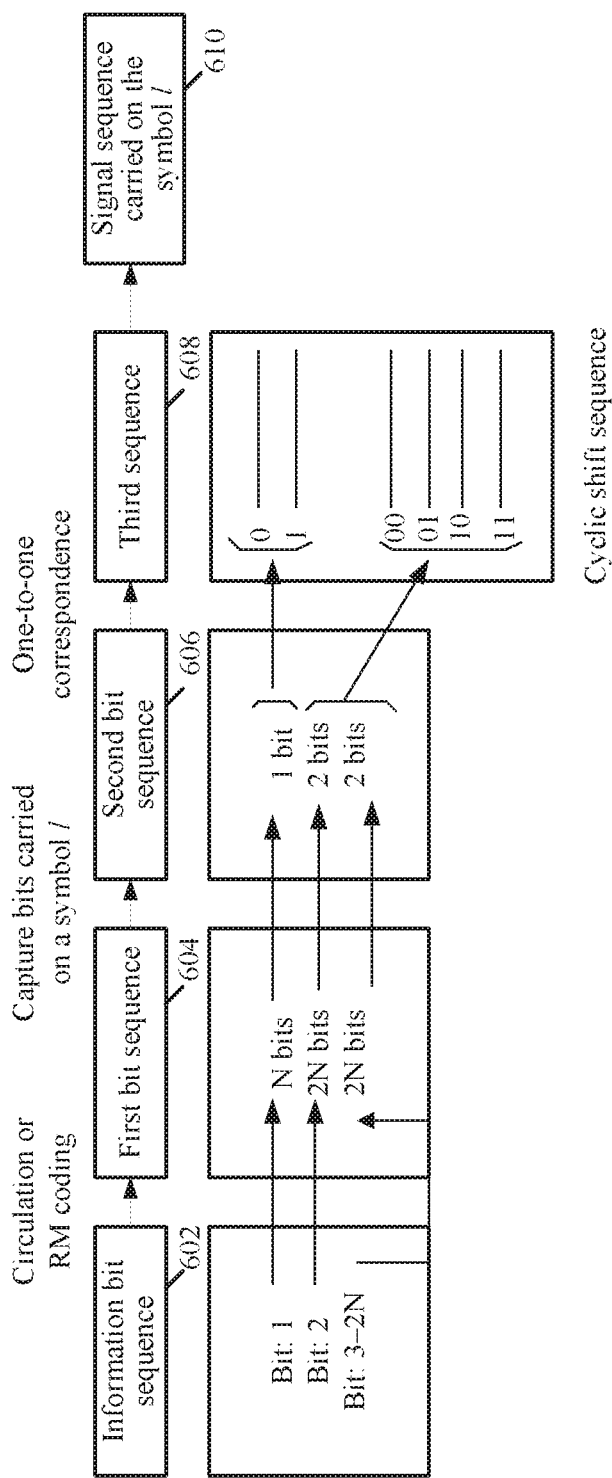
FIG. 6 is a schematic flowchart of an uplink control information transmission method according to an embodiment of the present disclosure.

FIG. 6 is a schematic flowchart of a method for generating a signal carried on a symbol l of an uplink control channel according to an embodiment of the present disclosure. FIG. 6 shows a procedure for generating, according to an information bit sequence 602, a signal 610 carried on the symbol l of the uplink control channel. The method in FIG. 6 may be executed by a terminal device.

As shown in FIG. 6, the terminal device determines to-be-transmitted uplink control information. Optionally, the terminal device determines the information bit sequence 602 of the uplink control information.

Then, the terminal device sends the to-be-transmitted uplink control information by using the uplink control channel. The uplink control channel occupies N symbols, and N is a positive integer. A signal carried on the symbol l of the N symbols is corresponding to a third sequence 608, and the third sequence 608 is a cyclic shift sequence. A cyclic shift of the third sequence 608 is determined according to a second bit sequence 606 carried on the symbol l.

Optionally, if a bit quantity of the information bit sequence 602 of the to-be-transmitted uplink control information is 1, a bit quantity of the second bit sequence 606 carried on the symbol l is 1, and a bit quantity of a first bit sequence 604 carried on the N symbols is N. The second bit sequence 606 is a part of the first bit sequence 604, and the first bit sequence 604 is obtained by cyclically repeating the information bit sequence corresponding to the to-be-transmitted uplink control information.

Optionally, if a bit quantity of the information bit sequence 602 of the to-be-transmitted uplink control information is 2, a bit quantity of the second bit sequence 606 carried on the symbol l is 2, and a bit quantity of a first bit sequence carried on the N symbols is 2N. The second bit sequence 606 is a part of the first bit sequence 604, and the first bit sequence 604 is obtained by cyclically repeating the information bit sequence corresponding to the to-be-transmitted uplink control information.

If a bit quantity of the information bit sequence 602 of the to-be-transmitted uplink control information is greater than or equal to 3 and less than or equal to 2N, a bit quantity of the second bit sequence 606 carried on the symbol l is 2, and a bit quantity of a first bit sequence 604 carried on the N symbols is 2N. The second bit sequence 606 is a part of the first bit sequence 604, and the first bit sequence 604 is obtained, by means of Reed-Muller RM coding, from the information bit sequence corresponding to the to-be-transmitted uplink control information.

Figure 7:
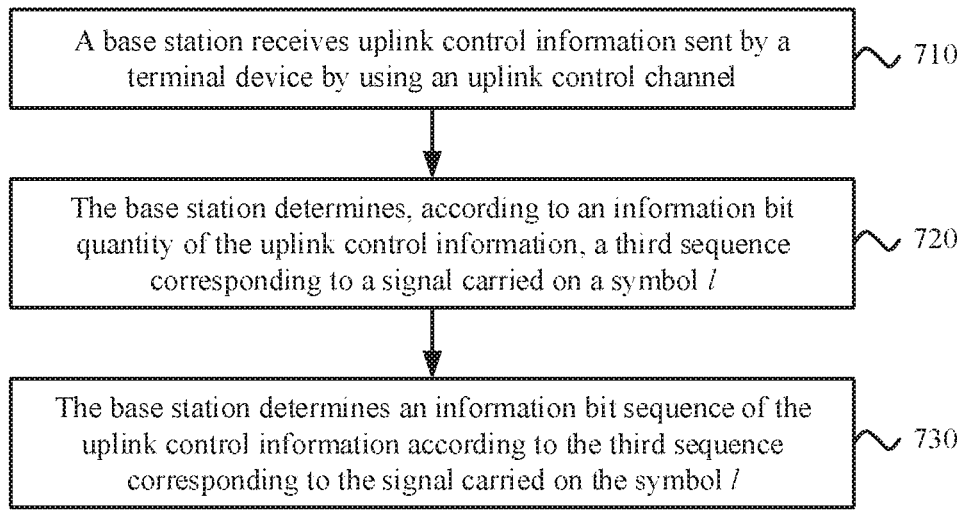
FIG. 7 is a schematic flowchart of an uplink control information transmission method according to an embodiment of the present disclosure.

FIG. 7 is a schematic flowchart of an uplink control information transmission method according to an embodiment of the present disclosure. The method in FIG. 7 may be executed by a base station.

Optionally, a first bit sequence, a second bit sequence, and a signal carried on a symbol l of N symbols in this embodiment are the same as those described in FIG. 2. Details are not repeated herein.

Step 710: The base station receives uplink control information sent by a terminal device by using an uplink control channel, where the uplink control channel occupies N symbols, N is a positive integer, a signal carried on a symbol l of the N symbols is corresponding to a third sequence, the third sequence is a cyclic shift sequence, l is an integer, and l=0, 1, . . . , N−1. Optionally, the third sequence is a Zadoff-Chu sequence, or a sequence obtained from a Zadoff-Chu sequence by means of cyclic extension or truncation.

Step 720: The base station determines, according to an information bit quantity of the uplink control information, the third sequence corresponding to the signal carried on the symbol l.

Step 730: The base station determines an information bit sequence of the uplink control information according to the third sequence corresponding to the signal carried on the symbol l.

Optionally, step 730 includes the following steps.

Step 730-1: The base station determines, according to the third sequence corresponding to the signal carried on the symbol l, a second bit sequence carried on the symbol l.

Optionally, this step includes: determining, by the base station according to a cyclic shift of the third sequence corresponding to the signal carried on the symbol l, the second bit sequence carried on the symbol l, where the cyclic shift of the third sequence is corresponding to a status value of the second bit sequence, the cyclic shift of the third sequence is one of M cyclic shifts, and the M cyclic shifts are in a one-to-one correspondence to M status values. In addition, M is 2 raised to the power of $M_1$, $M_1$ is a bit quantity of the second bit sequence, and both M and $M_1$ are positive integers.

The M status values of the second bit sequence have been described in step 520 in FIG. 5, and details are not repeated herein.

Optionally, an interval of cyclic shifts corresponding to any two of the M status values is greater than or equal to 2.

Step 730-2: The base station determines the information bit sequence of the uplink control information according to the second bit sequence carried on the symbol l.

Optionally, the symbol quantity N of the uplink control channel is less than a quantity of symbols included in one subframe.

In conclusion, according to the uplink control information transmission method provided in this embodiment of the present disclosure, the uplink control information is transmitted by using the uplink control channel that occupies N symbols, where N may be less than the symbol quantity of one subframe, for example, N is 2. This implements uplink control information transmission on a relatively small quantity of symbols. In addition, the third sequence is a cyclic shift sequence; therefore, a single-carrier characteristic of the uplink control information can be maintained by using the sequence to carry the uplink control information.

Moreover, in the transmission method, a quantity of bits carried on each symbol of the uplink control channel is controlled to be not greater than 2. Therefore, when each symbol carries 2-bit information, intersymbol power accumulation can be effectively used to improve uplink control information performance, so as to obtain a transmission gain. In addition, a characteristic of mutual orthogonality between linear complex exponential sequences corresponding to different information bit sequences is effectively used, so as to obtain an additional transmission gain.

Optionally, the uplink control information transmission method implemented by the base station may also be described with reference to FIG. 6.

First, the base station determines to-be-detected uplink control information. Optionally, the base station may determine an information bit quantity of the to-be-detected uplink control information. That is, the base station may determine the information bit quantity of the to-be-transmitted uplink control information according to factors such as a quantity of carriers configured by a terminal device and a transmission mode of each carrier. Optionally, the information bit quantity may be equal to a product of the quantity of carriers and a quantity of codewords supported by each carrier. This step has been described in step 110-1 in FIG. 2, and details are not repeated herein.

Then, the base station detects the to-be-detected uplink control information on an uplink control channel. The uplink control channel is corresponding to N symbols, and N is a positive integer. A signal carried on a symbol l of the N symbols is corresponding to a third sequence 608, and the third sequence 608 is a cyclic shift sequence. A cyclic shift of the third sequence 608 is determined according to a second bit sequence 606 carried on the symbol l.

Optionally, if the information bit quantity of the to-be-detected uplink control information is 1, a bit quantity of the second bit sequence 606 carried on the symbol l is 1, and a bit quantity of a first bit sequence 604 carried on the N symbols is N. The second bit sequence 606 is a part of the first bit sequence 604, and the first bit sequence 604 is obtained by cyclically repeating a candidate information bit sequence corresponding to the to-be-detected uplink control information.

If the information bit quantity of the to-be-detected uplink control information is 2, a bit quantity of the second bit sequence 606 carried on the symbol l is 2, and a bit quantity of a first bit sequence 604 carried on the N symbols is 2N. The second bit sequence 606 is a part of the first bit sequence 604, and the first bit sequence 604 is obtained by cyclically repeating a candidate information bit sequence corresponding to the to-be-detected uplink control information.

If the information bit quantity of the to-be-detected uplink control information is greater than or equal to 3 and less than or equal to 2N, a bit quantity of the second bit sequence 606 carried on the symbol l is 2, and a bit quantity of a first bit sequence 604 carried on the N symbols is 2N. The second bit sequence 606 is a part of the first bit sequence 604, and the first bit sequence 604 is obtained, by means of Reed-Muller RM coding, from a candidate information bit sequence corresponding to the to-be-detected uplink control information.

Figure 8:
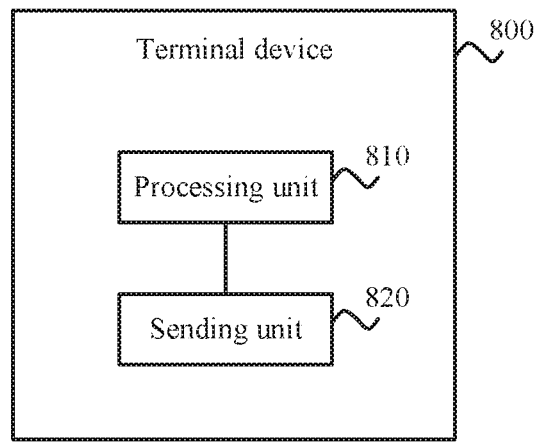
FIG. 8 is a schematic structural diagram of a terminal device according to an embodiment of the present disclosure.

FIG. 8 is a schematic diagram of a terminal device according to an embodiment of the present disclosure. The terminal device 800 in FIG. 8 includes a processing unit 810 and a sending unit 820.

The processing unit 810 is configured to determine an information bit sequence of to-be-transmitted uplink control information. A method for determining the information bit sequence by the processing unit 810 is the same as that described in step 110 in FIG. 2. Details are not repeated herein.

Further, the processing unit 810 is further configured to determine a first sequence according to the information bit sequence. The first sequence is a linear-phase complex exponential sequence.

Optionally, that the processing unit 810 determines a first sequence according to the information bit sequence includes the following steps.

First, the processing unit 810 determines a first bit sequence according to the information bit sequence and a symbol quantity N of an uplink control channel. A bit quantity of the first bit sequence is N or 2N.

Optionally, that the processing unit 810 determines a first bit sequence according to the information bit sequence includes the following cases:

Case 1: When a bit quantity of the information bit sequence is 1, the processing unit 810 determines that the bit quantity of the first bit sequence is N, and that the first bit sequence is obtained by cyclically repeating the information bit sequence for N times.

Case 2: When a bit quantity of the information bit sequence is 2, the processing unit 810 determines that the bit quantity of the first bit sequence is 2N, and that the first bit sequence is obtained by cyclically repeating the information bit sequence for N times.

Case 3: When a bit quantity of the information bit sequence is greater than or equal to 3 and less than or equal to 2N, the processing unit 810 determines that the bit quantity of the first bit sequence is 2N, and that the first bit sequence is obtained from the information bit sequence by means of Reed-Muller coding.

Then, the processing unit 810 determines, according to the first bit sequence, a second bit sequence carried on a symbol l. The second bit sequence is a part, carried on the symbol l, of the first bit sequence.

Then, the processing unit 810 determines the corresponding first sequence according to the second bit sequence carried on the symbol l.

Optionally, that the processing unit 810 determines the corresponding first sequence according to the second bit sequence carried on the symbol l includes:

when a bit quantity of the second bit sequence carried on the symbol l is 1, if the second bit sequence is 0, the first sequence is {1,1,1,1,1,1,1,1,1,1,1,1}; or if the second bit sequence is 1, the first sequence is {1,−1,1,−1,1,−1,1,−1,1,−1,1,−1}; or when a bit quantity of the second bit sequence carried on the symbol l is 2, if the second bit sequence is 00, the first sequence is {1,1,1,1,1,1,1,1,1,1,1,1}; if the second bit sequence is 01, the first sequence is {1, −j,1,−1,1,−j,1,−1, 1,−j,1,−1}; if the second bit sequence is 10, the first sequence is {1,−1,1,−1,1,−1,1,−1,1,−1,1,−1}; or if the second bit sequence is 11, the first sequence is {1,j,−1, −j,1,j,−1, −j,1,j,−1, −j}.

In addition, optionally, that the processing unit 810 determines a first sequence according to the information bit sequence includes:

when a bit quantity of the information bit sequence is 1, if the information bit sequence is 0, the first sequence is {1,1,1,1,1,1,1,1,1,1,1,1}; or if the information bit sequence is 1, the first sequence is {1,-1,1,-1,1,-1,1,-1,1,-1,1,-1}; or when a bit quantity of the information bit sequence is 2, if the information bit sequence is 00, the first sequence is {1,1,1,1,1,1,1,1,1,1,1,1}; if the information bit sequence is 01, the first sequence is {1, -j,1,-1,1,-j,1,-1,1,-j,1,-1}; if the information bit sequence is 10, the first sequence is {1,-1,1,-1,1,-1,1,-1,1,-1,1,-1}; or if the information bit sequence is 11, the first sequence is {1,j,-1, -j,1,j,-1, -j,1,j,-1, -j}.

A method for determining the first sequence according to the information bit sequence by the processing unit 810 is the same as that described in step 120 in FIG. 2. Details are not repeated herein.

The sending unit 820 is configured to send the to-be-transmitted uplink control information to a base station by using the uplink control channel. The uplink control channel occupies N symbols, N is a positive integer, a signal carried on the symbol l of the N symbols is directly proportional to a product of the first sequence and a second sequence, and the second sequence is a cyclic shift sequence.

Optionally, the second sequence is a Zadoff-Chu sequence, or a sequence obtained from a Zadoff-Chu sequence by means of cyclic extension or truncation.

Optionally, the symbol quantity N of the uplink control channel is less than a quantity of symbols included in one subframe.

A process in which the sending unit 820 sends the to-be-transmitted uplink control information to the base station by using the uplink control channel is the same as that described in step 130 in FIG. 2. Details are not repeated herein.

Optionally, the first sequence, the second sequence, the first bit sequence, the second bit sequence, and the signal carried on the symbol l of the N symbols in this embodiment are the same as those described in FIG. 2. Details are not repeated herein.

In conclusion, the terminal device provided in this embodiment of the present disclosure transmits the uplink control information by using the uplink control channel that occupies N symbols, where N may be less than the symbol quantity of one subframe, for example, N is 2. This implements uplink control information transmission on a relatively small quantity of symbols. In addition, in the uplink control information transmission method, a linear complex exponential sequence is introduced, so that in a sequence corresponding to the sent uplink control information, some bits do not change with the information bit sequence corresponding to the uplink control information. Therefore, the bits can be used as reference signals, and the base station can obtain a channel characteristic of a radio channel according to these reference signals. This improves transmission reliability of the uplink control information.

Moreover, a quantity of bits carried on each symbol of the uplink control channel used by the terminal device to transmit data is not greater than 2. Therefore, when each symbol carries 2-bit information, intersymbol power accumulation can be effectively used to improve uplink control information performance, so as to obtain a transmission gain. In addition, a characteristic of mutual orthogonality between linear complex exponential sequences corresponding to different information bit sequences is effectively used, so as to obtain an additional transmission gain.

Figure 9:
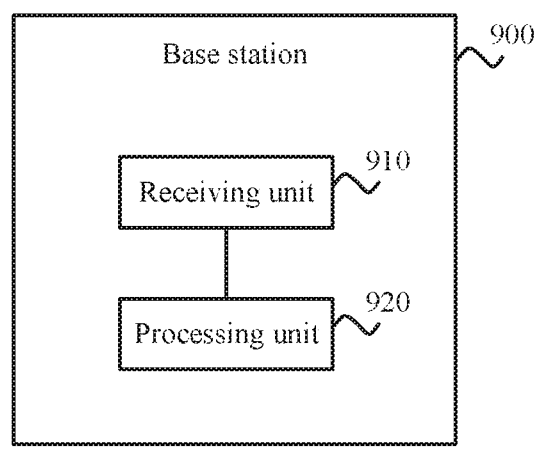
FIG. 9 is a schematic structural diagram of a base station according to an embodiment of the present disclosure.

FIG. 9 is a schematic diagram of a base station according to an embodiment of the present disclosure. The base station 900 in FIG. 9 includes a receiving unit 910 and a processing unit 920.

The receiving unit 910 is configured to receive uplink control information sent by a terminal device by using an uplink control channel. The uplink control channel occupies N symbols, N is a positive integer, a signal carried on a symbol l of the N symbols is directly proportional to a product of a first sequence and a second sequence, and the second sequence is a cyclic shift sequence. A process in which the receiving unit 910 is configured to receive the uplink control information sent by the terminal device by using the uplink control channel is the same as that described in step 410 in FIG. 4. Details are not repeated herein.

The processing unit 920 is configured to determine the first sequence according to an information bit quantity of the uplink control information and the second sequence. The first sequence is a linear-phase complex exponential sequence.

Optionally, the base station determines a candidate set of the first sequence according to the information bit quantity, then performs maximum likelihood by using each sequence in the candidate set, and finally determines the first sequence sent by the terminal device.

A process in which the processing unit 920 is configured to determine the first sequence according to the information bit quantity of the uplink control information and the second sequence is the same as that described in step 420 in FIG. 4. Details are not repeated herein.

Further, the processing unit 920 is further configured to determine an information bit sequence of the uplink control information according to the first sequence.

Optionally, that the processing unit 920 determines an information bit sequence of the uplink control information according to the first sequence includes the following steps:

First, the processing unit 920 determines, according to the information bit quantity of the uplink control information, a bit quantity of a second bit sequence carried on the symbol l.

Then, the processing unit 920 determines, according to the first sequence and the bit quantity of the second bit sequence carried on the symbol l, the second bit sequence carried on the symbol l.

Then, the processing unit 920 determines the information bit sequence of the uplink control information according to the second bit sequence carried on the symbol l.

That the processing unit 920 determines, according to the first sequence and the bit quantity of the second bit sequence carried on the symbol l, the second bit sequence carried on the symbol l includes:

when the bit quantity of the second bit sequence carried on the symbol l is 1, if the first sequence is {1,1,1,1,1,1,1, 1,1,1,1,1}, the second bit sequence carried on the symbol l is 0; or if the first sequence is {1,-1,1,-1,1,-1,1,-1,1,-1, 1,-1}, the second bit sequence carried on the symbol l is 1; or when the bit quantity of the second bit sequence carried on the symbol l is 2, if the first sequence is {1,1,1,1,1,1,1, 1,1,1,1,1}, the second bit sequence carried on the symbol l is 00; if the first sequence is {1, -j,1,-1,1,-j,1,-1,1,-j,1,-1}, the second bit sequence carried on the symbol l is 01; if the first sequence is {1,-1,1,-1,1,-1,1,-1,1,-1,1,-1}, the second bit sequence carried on the symbol l is 10; or if the first sequence is {1,j,-1, -j,1,j,-1, -j,1,j,-1, -j}, the second bit sequence carried on the symbol l is 11.

In addition, optionally, that the processing unit 920 determines an information bit sequence of the uplink control information according to the first sequence and the bit quantity of the uplink control information includes:

when the bit quantity of the uplink control information is 1, if the first sequence is {1,1,1,1,1,1,1,1,1,1,1,1}, the second bit sequence carried on the symbol l is 0; or if the first sequence is {1,−1,1,−1,1,−1,1,−1,1,−1,1,−1}, the second bit sequence carried on the symbol l is 1; or when the bit quantity of the uplink control information is 2, if the first sequence is {1,1,1,1,1,1,1,1,1,1,1,1}, the second bit sequence carried on the symbol l is 00; if the first sequence is {1, −j,1,−1,1,−j,1,−1,1,−j,1,−1}, the second bit sequence carried on the symbol l is 01; if the first sequence is {1,−1,1,−1,1,−1,1,−1,1,−1,1,−1}, the second bit sequence carried on the symbol l is 10; or if the first sequence is {1,j,−1, −j,1,j,−1, −j,1,j,−1, −j}, the second bit sequence carried on the symbol l is 11.

A process in which the processing unit 920 determines the information bit sequence of the uplink control information according to the first sequence is the same as that described in step 430 in FIG. 4. Details are not repeated herein.

Optionally, the first sequence, the second sequence, a first bit sequence, the second bit sequence, and the signal carried on the symbol l of the N symbols in this embodiment are the same as those described in FIG. 2. Details are not repeated herein.

Optionally, the symbol quantity N of the uplink control channel is less than a quantity of symbols included in one subframe. Optionally, N may be greater than 1, so as to meet a requirement of a scenario in which a relatively large quantity of bits of uplink control information need to be transmitted or relatively large uplink control channel coverage is required. N may be less than the symbol quantity of one subframe, so that the uplink control information can be transmitted on a relatively small quantity of symbols.

In conclusion, according to the base station provided in this embodiment of the present disclosure, the base station transmits the uplink control information by using the uplink control channel that occupies N symbols, where N may be less than the symbol quantity of one subframe, for example, N is 2. This implements uplink control information transmission on a relatively small quantity of symbols. In addition, in the uplink control information transmission method, a linear complex exponential sequence is introduced, so that in a sequence corresponding to the sent uplink control information, some bits do not change with the information bit sequence corresponding to the uplink control information. Therefore, the bits can be used as reference signals, and the base station can obtain a channel characteristic of a radio channel according to these reference signals. This improves transmission reliability of the uplink control information.

Figure 10:
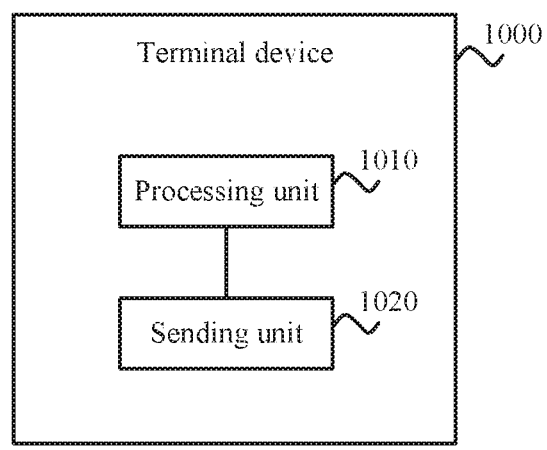
FIG. 10 is a schematic structural diagram of a terminal device according to an embodiment of the present disclosure.

FIG. 10 is a schematic diagram of a terminal device according to an embodiment of the present disclosure. The terminal device 1000 in FIG. 10 includes a processing unit 1010 and a sending unit 1020.

The processing unit 1010 is configured to determine an information bit sequence of to-be-transmitted uplink control information. A method for determining the information bit sequence by the processing unit 1010 is the same as that described in step 110 in FIG. 2. Details are not repeated herein.

The processing unit 1010 is further configured to determine, according to the information bit sequence, a second bit sequence carried on a symbol l of an uplink control channel. The uplink control channel occupies N symbols, N is a positive integer, l is an integer, and l=0, 1, . . . , N−1.

Optionally, that the processing unit 1010 determines, according to the information bit sequence, a second bit sequence carried on a symbol l of an uplink control channel includes the following steps.

First, the processing unit 1010 determines a first bit sequence according to the information bit sequence and the quantity N of symbols occupied by the uplink control channel. A bit quantity of the first bit sequence is N or 2N. This process includes the following three cases:

Case 1: When a bit quantity of the information bit sequence is 1, the processing unit 1010 determines that the bit quantity of the first bit sequence is N, and that the first bit sequence is obtained by cyclically repeating the information bit sequence for N times.

Case 2: When a bit quantity of the information bit sequence is 2, the processing unit 1010 determines that the bit quantity of the first bit sequence is 2N, and that the first bit sequence is obtained by cyclically repeating the information bit sequence for N times.

Case 3: When a bit quantity of the information bit sequence is greater than or equal to 3 and less than or equal to 2N, the processing unit 1010 determines that the bit quantity of the first bit sequence is 2N, and that the first bit sequence is obtained from the information bit sequence by means of Reed-Muller coding.

Then, the processing unit 1010 determines, according to the first bit sequence, the second bit sequence carried on the symbol l of the uplink control channel. The second bit sequence carried on the symbol l is a part, carried on the symbol l, of the first bit sequence.

A process in which the processing unit 1010 determines, according to the information bit sequence, the second bit sequence carried on the symbol l of the uplink control channel has been described in step 510 in FIG. 5, and details are not repeated herein.

The processing unit 1010 is further configured to determine, according to a status value of the second bit sequence, a cyclic shift of a third sequence corresponding to the symbol l, and determine, according to the cyclic shift, the third sequence corresponding to the symbol l.

Optionally, status values of the second bit sequence are in a one-to-one correspondence to a plurality of cyclic shifts of the third sequence. The status value of the second bit sequence is one of M status values. The M status values are in a one-to-one correspondence to M cyclic shifts. M is 2 raised to the power of $M_1$, $M_1$ is a bit quantity of the second bit sequence, and both M and $M_1$ are positive integers. Further, optionally, an interval of cyclic shifts corresponding to any two of the M status values is greater than or equal to 2.

Optionally, the third sequence is a Zadoff-Chu sequence, or a sequence obtained from a Zadoff-Chu sequence by means of cyclic extension or truncation.

A process in which the processing unit 1010 determines, according to the M status values of the second bit sequence, the cyclic shift of the third sequence corresponding to the symbol l has been described in step 530 in FIG. 5, and details are not repeated herein.

The sending unit 1020 is configured to map the third sequence corresponding to the symbol l onto the symbol l of the uplink control channel, and send the third sequence to a base station. This process has been described in step 540 in FIG. 5, and details are not repeated herein.

Optionally, the symbol quantity N of the uplink control channel is less than a quantity of symbols included in one subframe. Optionally, N may be greater than 1, so as to meet a requirement of a scenario in which a relatively large quantity of bits of uplink control information need to be transmitted or relatively large uplink control channel coverage is required. N may be less than the symbol quantity of one subframe, so that the uplink control information can be transmitted on a relatively small quantity of symbols.

In conclusion, the terminal device provided in this embodiment of the present disclosure transmits the uplink control information by using the uplink control channel that occupies N symbols, where N may be less than the symbol quantity of one subframe, for example, N is 2. This implements uplink control information transmission on a relatively small quantity of symbols. In addition, the third sequence is a cyclic shift sequence; therefore, a single-carrier characteristic of the uplink control information can be maintained by using the sequence to carry the uplink control information.

Moreover, in the transmission method, a quantity of bits carried on each symbol of the uplink control channel is controlled to be not greater than 2. Therefore, when each symbol carries 2-bit information, intersymbol power accumulation can be effectively used to improve uplink control information performance, so as to obtain a transmission gain. In addition, a characteristic of mutual orthogonality between linear complex exponential sequences corresponding to different information bit sequences is effectively used, so as to obtain an additional transmission gain.

Figure 11:
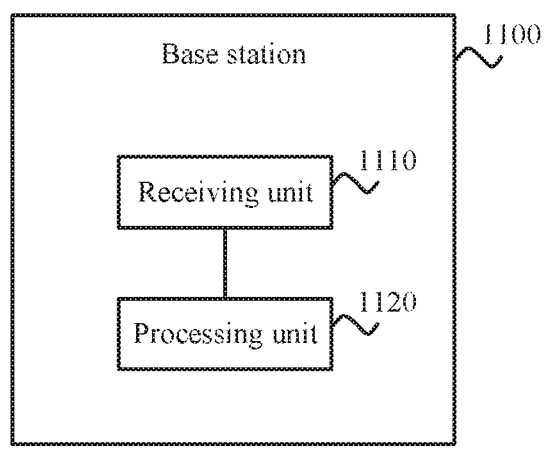
FIG. 11 is a schematic structural diagram of a base station according to an embodiment of the present disclosure.

FIG. 11 is a schematic diagram of a base station according to an embodiment of the present disclosure. The base station 1100 in FIG. 11 includes a receiving unit 1110 and a processing unit 1120.

Optionally, a first bit sequence, a second bit sequence, and a signal carried on a symbol l of N symbols in this embodiment are the same as those described in FIG. 2. Details are not repeated herein.

The receiving unit 1110 is configured to receive uplink control information sent by a terminal device by using an uplink control channel. The uplink control channel occupies N symbols, N is a positive integer, a signal carried on a symbol l of the N symbols is corresponding to a third sequence, the third sequence is a cyclic shift sequence, l is an integer, and l=0, 1, . . . , N−1. Optionally, the third sequence is a Zadoff-Chu sequence, or a sequence obtained from a Zadoff-Chu sequence by means of cyclic extension or truncation.

The processing unit 1120 is configured to determine, according to an information bit quantity of the uplink control information, the third sequence corresponding to the signal carried on the symbol l.

The processing unit 1120 is further configured to determine an information bit sequence of the uplink control information according to the third sequence corresponding to the signal carried on the symbol l.

Optionally, that the processing unit 1120 determines an information bit sequence of the uplink control information according to the third sequence corresponding to the signal carried on the symbol l includes:

determining, by the processing unit 1120 according to the third sequence corresponding to the signal carried on the symbol l, a second bit sequence carried on the symbol l, and determining the information bit sequence of the uplink control information according to the second bit sequence carried on the symbol l.

Further, optionally, the determining, by the processing unit 1120 according to the third sequence corresponding to the signal carried on the symbol l, a second bit sequence carried on the symbol l includes:

determining, according to a cyclic shift of the third sequence corresponding to the signal carried on the symbol l, the second bit sequence carried on the symbol l, where the second bit sequence includes M status values, the cyclic shift of the third sequence is corresponding to a status value of the second bit sequence, the cyclic shift of the third sequence is one of M cyclic shifts, the M cyclic shifts are in a one-to-one correspondence to the M status values, M is 2 raised to the power of $M_1$, $M_1$ is a bit quantity of the second bit sequence, and both M and $M_1$ are positive integers.

Optionally, the M status values of the second bit sequence have been described in FIG. 5, and details are not repeated herein.

Optionally, an interval of cyclic shifts corresponding to any two of the M status values is greater than or equal to 2.

Optionally, the symbol quantity N of the uplink control channel is less than a quantity of symbols included in one subframe. Optionally, N may be greater than 1, so as to meet a requirement of a scenario in which a relatively large quantity of bits of uplink control information need to be transmitted or relatively large uplink control channel coverage is required. N may be less than the symbol quantity of one subframe, so that the uplink control information can be transmitted on a relatively small quantity of symbols.

In conclusion, the base station provided in this embodiment of the present disclosure transmits the uplink control information by using the uplink control channel that occupies N symbols, where N may be less than the symbol quantity of one subframe, for example, N is 2. This implements uplink control information transmission on a relatively small quantity of symbols. In addition, the third sequence is a cyclic shift sequence; therefore, a single-carrier characteristic of the uplink control information can be maintained by using the sequence to carry the uplink control information.

Moreover, in the transmission method, a quantity of bits carried on each symbol of the uplink control channel is controlled to be not greater than 2. Therefore, when each symbol carries 2-bit information, intersymbol power accumulation can be effectively used to improve uplink control information performance, so as to obtain a transmission gain. In addition, a characteristic of mutual orthogonality between linear complex exponential sequences corresponding to different information bit sequences is effectively used, so as to obtain an additional transmission gain.

Figure 12:
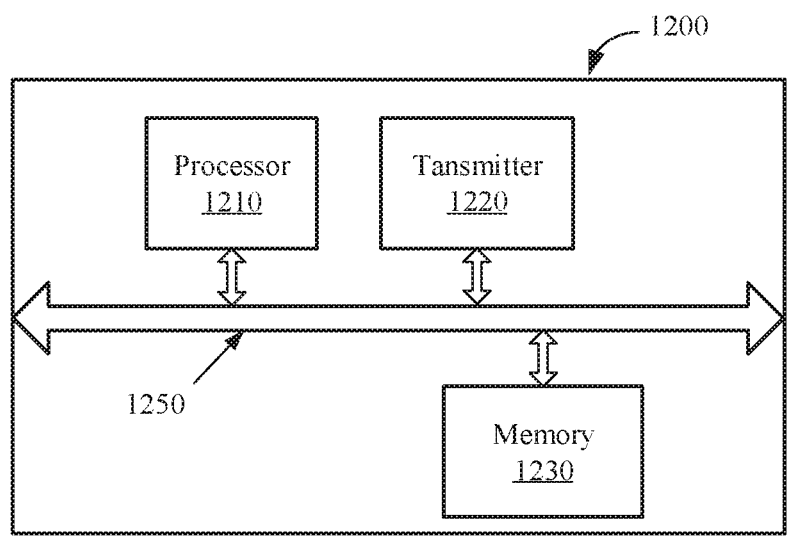
FIG. 12 is a schematic structural diagram of a terminal device according to an embodiment of the present disclosure.

It should be noted that, in the embodiments of the present disclosure, the processing unit 810 in FIG. 8 and the processing unit 1110 in FIG. 10 can be implemented by a processor, and the receiving unit 820 in FIG. 8 and the receiving unit 1020 in FIG. 10 can be implemented by a receiver. As shown in FIG. 12, a terminal device 1200 may include a processor 1210, a transmitter 1220, and a memory 1230. The memory 1230 may be configured to store a program/code pre-installed before delivery of the terminal device, store code used by the processor 1210 for execution, and the like.

Components of the terminal device 1200 are coupled together by using a bus system 1250. In addition to a data bus, the bus system 1250 further includes a power bus, a control bus, and a status signal bus.

Figure 13:
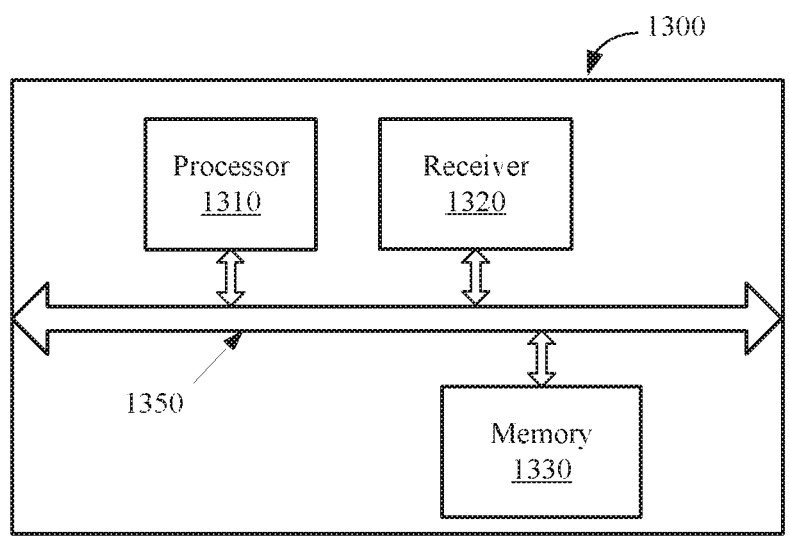
FIG. 13 is a schematic structural diagram of a base station according to an embodiment of the present disclosure.

In this embodiment of the present disclosure, the receiving unit 910 in FIG. 9 and the receiving unit 1110 in FIG. 11 can be implemented by a receiver, and the processing unit 920 in FIG. 9 and the processing unit 1120 in FIG. 11 can be implemented by a processor. As shown in FIG. 13, a base station 1300 may include a processor 1310, a receiver 1320, and a memory 1330. The memory 1330 may be configured to store a program/code pre-installed before delivery of a base station, store code used by the processor 1310 for execution, and the like.

Components of the base station 1300 are coupled together by using a bus system 1350. In addition to a data bus, the bus system 1350 further includes a power bus, a control bus, and a status signal bus.

Figure 14:
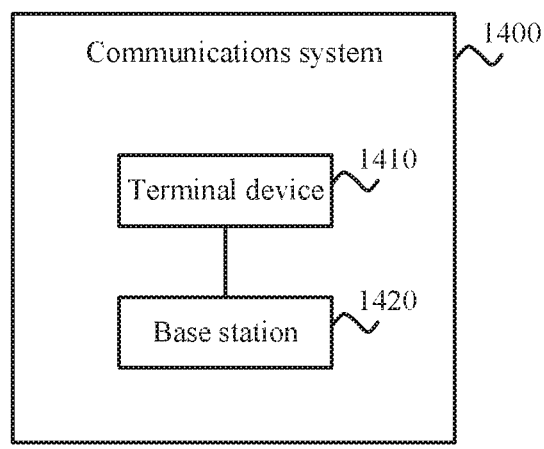
FIG. 14 is a schematic diagram of a communications system according to an embodiment of the present disclosure.

FIG. 14 is a schematic diagram of a communications system according to an embodiment of the present disclosure. The communications system 1400 in FIG. 14 includes a terminal device 1410 and a base station 1420.

The terminal device 1410 is configured to determine an information bit sequence of to-be-transmitted uplink control information, and determine a first sequence according to the information bit sequence. The first sequence is a linear-phase complex exponential sequence.

The terminal device 1410 is further configured to send the to-be-transmitted uplink control information to the base station 1420 by using an uplink control channel. The uplink control channel occupies N symbols, N is a positive integer, a signal carried on a symbol l of the N symbols is directly proportional to a product of the first sequence and a second sequence, and the second sequence is a cyclic shift sequence.

The base station 1420 is configured to receive the uplink control information sent by the terminal device by using the uplink control channel.

The base station 1420 is further configured to determine the first sequence according to an information bit quantity of the uplink control information and the second sequence, and determine the information bit sequence according to the first sequence.

Optionally, in the communications system 1400 in this embodiment of the present disclosure, the terminal device 1410 may be the terminal device 800 in FIG. 8, and the base station 1420 may be the base station 900 in FIG. 9.

Figure 15:
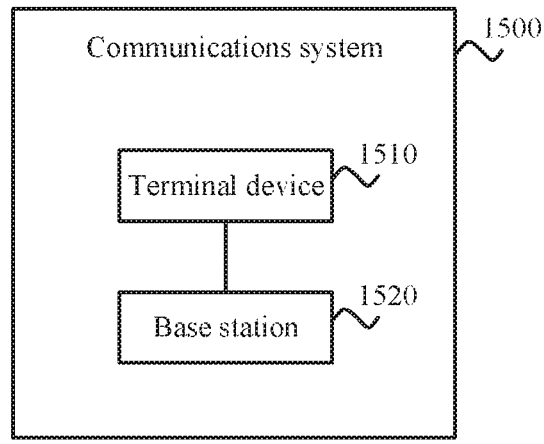
FIG. 15 is a schematic diagram of a communications system according to an embodiment of the present disclosure.

FIG. 15 is a schematic diagram of a communications system according to an embodiment of the present disclosure. The communications system 1500 in FIG. 15 includes a terminal device 1510 and a base station 1520.

The terminal device 1510 is configured to determine an information bit sequence of to-be-transmitted uplink control information, and determine a second bit sequence carried on a symbol l of an uplink control channel according to the information bit sequence. The uplink control channel occupies N symbols, N is a positive integer, l is an integer, and l=0, 1, ..., N−1. The terminal device 1510 is further configured to determine, according to a status value of the second bit sequence, a cyclic shift of a third sequence corresponding to the symbol l, and determine, according to the cyclic shift, the third sequence corresponding to the symbol l.

The terminal device 1510 is further configured to map the third sequence corresponding to the symbol l onto the symbol l of the uplink control channel, and send the third sequence to the base station 1520.

The base station 1520 is configured to receive the uplink control information sent by the terminal device 1510 by using the uplink control channel.

The base station 1520 is further configured to determine, according to an information bit quantity of the uplink control information, the third sequence corresponding to the signal carried on the symbol l, and determine the information bit sequence according to the third sequence corresponding to the signal carried on the symbol l.

Optionally, in the communications system 1500 in this embodiment of the present disclosure, the terminal device 1510 may be the terminal device 1000 in FIG. 10, and the base station 1520 may be the base station 1100 in FIG. 11.

Figure 16:
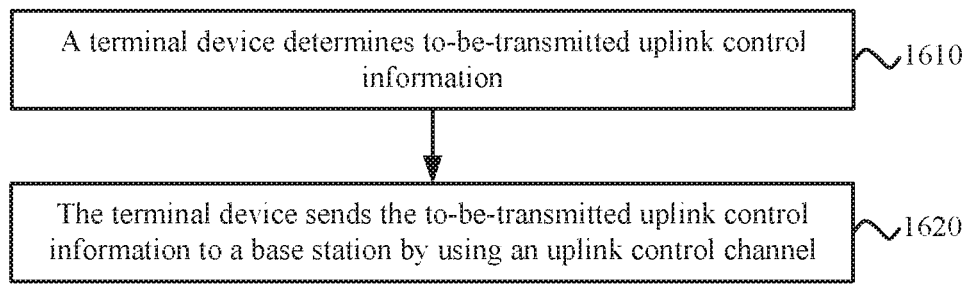
FIG. 16 is a schematic flowchart of an uplink control information transmission method according to an embodiment of the present disclosure.

Optionally, an embodiment of the present disclosure further provides the following uplink control information transmission method, as shown in FIG. 16. FIG. 16 is a schematic flowchart of the uplink control information transmission method according to this embodiment of the present disclosure. The method in FIG. 16 may be executed by a terminal device.

Step 1610: The terminal device determines to-be-transmitted uplink control information.

In this step, that the terminal device determines to-be-transmitted uplink control information may be that the terminal device determines an information bit sequence of the to-be-transmitted uplink control information. For details, refer to step 110 in FIG. 2. Details are not repeated herein.

Optionally, an information bit quantity corresponding to the uplink control information is greater than 2N, and N is a quantity of symbols occupied by an uplink control channel.

Step 1620: The terminal device sends the to-be-transmitted uplink control information to a base station by using an uplink control channel.

Optionally, the uplink control channel is corresponding to N symbols, and N is a positive integer greater than 1. The N symbols include one symbol used for reference signal transmission. The remaining N−1 symbols are used for uplink control information transmission. A signal carried on each of the N−1 symbols is corresponding to 24 coded bits, and the 24 coded bits are obtained, by means of RM code coding, from the information bit sequence corresponding to the to-be-transmitted uplink control information. The 24 coded bits are corresponding to 12 QPSK modulation symbols, and each subcarrier carries one QPSK modulation symbol.

For example, when N=2, of the two symbols corresponding to the uplink control channel, a first symbol is used to transmit the to-be-transmitted uplink control information, and a second symbol is used to transmit a reference signal. A signal carried on the symbol used to transmit the uplink control information is corresponding to 24 coded bits, and the 24 coded bits are obtained, by means of RM code coding, from the information bit sequence corresponding to the to-be-transmitted uplink control information. The 24 coded bits are corresponding to 12 QPSK modulation symbols, and each subcarrier carries one QPSK modulation symbol.

When N=3, of the three symbols corresponding to the uplink control channel, a first symbol and a third symbol are used to transmit the to-be-transmitted uplink control information, and a second symbol is used to transmit a reference signal. A signal carried on the first symbol is corresponding to 24 coded bits; the 24 coded bits are obtained, by means of RM code coding, from the information bit sequence corresponding to the to-be-transmitted uplink control information; and the 24 coded bits are corresponding to 12 QPSK modulation symbols, and each subcarrier carries one QPSK modulation symbol. A signal carried on the third symbol is corresponding to 24 coded bits; the 24 coded bits are obtained, by means of RM code coding, from the information bit sequence corresponding to the to-be-transmitted uplink control information; and the 24 coded bits are corresponding to 12 QPSK modulation symbols, and each subcarrier carries one QPSK modulation symbol. The signal carried on the third symbol may be the same as or different from the signal carried on the first symbol. For example, the first symbol and the third symbol may be modulated by using an orthogonal cover code. For example, the orthogonal cover code may be {1,1} or {1,−1}.

In this embodiment, 24 coded bits are carried by using the symbol that carries the uplink control information. The 24 coded bits are obtained, by means of RM code coding, from the information bit sequence corresponding to the to-be-transmitted uplink control information. According to an RM code characteristic, a bit quantity of the information bit sequence corresponding to the uplink control information may be greater than 2. Therefore, according to this embodiment, transmission of uplink control information with a relatively large quantity of bits is supported. For example, this embodiment can be used for uplink control information transmission in a scenario of carrier aggregation or a short TTI.

Figure 17:
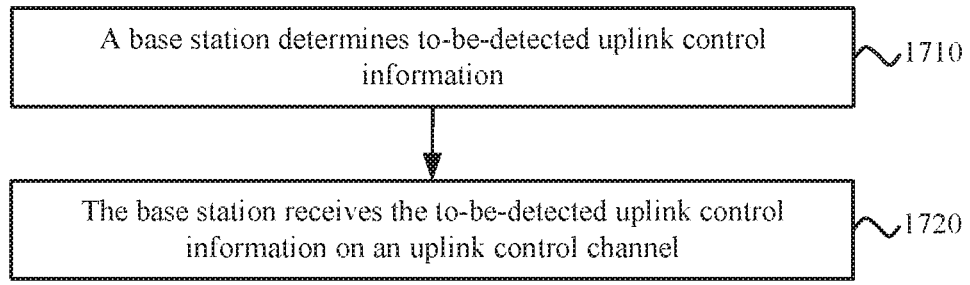
FIG. 17 is a schematic flowchart of an uplink control information transmission method according to an embodiment of the present disclosure.

Optionally, an embodiment of the present disclosure further provides the following uplink control information transmission method, as shown in FIG. 17. FIG. 17 is a schematic flowchart of the uplink control information transmission method according to this embodiment of the present disclosure. The method in FIG. 17 may be executed by a base station.

Step 1710: The base station determines to-be-detected uplink control information.

Optionally, the base station may determine an information bit quantity of the to-be-detected uplink control information.

Step 1720: The base station receives the to-be-detected uplink control information on an uplink control channel.

Descriptions of the uplink control channel in this step are the same as those described in step 1620 in FIG. 16, and details are not repeated herein.

Figure 18:
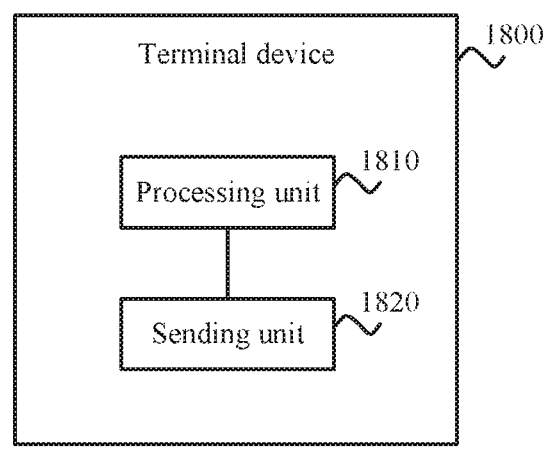
FIG. 18 is a schematic structural diagram of a terminal device according to an embodiment of the present disclosure.

FIG. 18 is a schematic diagram of a terminal device according to an embodiment of the present disclosure. The terminal device 1800 in FIG. 18 includes a processing unit 1810 and a sending unit 1820.

The processing unit 1810 is configured to determine to-be-transmitted uplink control information.

Optionally, that the processing unit 1810 determines to-be-transmitted uplink control information may be the processing unit 1810 determines an information bit sequence of the to-be-transmitted uplink control information. For details, refer to step 110 in FIG. 2. Details are not repeated herein.

Optionally, an information bit quantity corresponding to the uplink control information is greater than 2N, and N is a quantity of symbols occupied by an uplink control channel.

The sending unit 1820 is configured to send the to-be-transmitted uplink control information to a base station by using the uplink control channel.

Descriptions of the uplink control channel in this step are the same as those described in step 1620 in FIG. 16, and details are not repeated herein.

Figure 19:
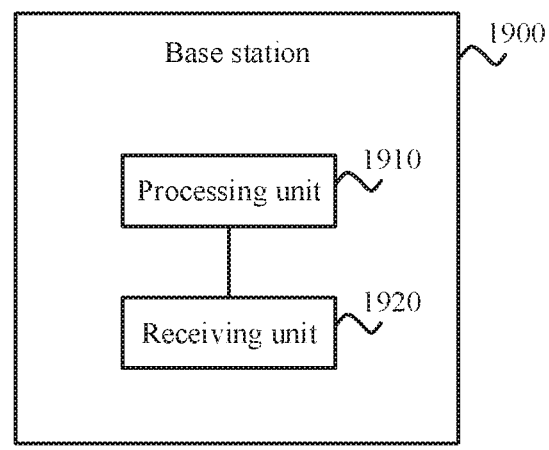
FIG. 19 is a schematic structural diagram of a base station according to an embodiment of the present disclosure.

FIG. 19 is a schematic diagram of a base station according to an embodiment of the present disclosure. The base station 1900 in FIG. 19 includes a processing unit 1910 and a receiving unit 1920.

The processing unit 1910 is configured to determine to-be-detected uplink control information. Optionally, the processing unit 1910 may determine an information bit quantity of the to-be-detected uplink control information.

The receiving unit 1920 is configured to receive the to-be-detected uplink control information on an uplink control channel. Descriptions of the uplink control channel in this step are the same as those described in step 1620 in FIG. 16, and details are not repeated herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for ease of convenience and brief description, for a detailed working process of the foregoing system, apparatus, and unit, refer to a corresponding process in the foregoing method embodiments. Details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate. Parts displayed as units may or may not be physical units, and may be located in one position or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   receiving, by a base station, uplink control information from a terminal device by using an uplink control channel, wherein the uplink control channel occupies N symbols, wherein N is equal to 1 or 2, wherein a signal carried on a symbol l of the N symbols is corresponding to a sequence, and wherein the sequence is a cyclic shift sequence; and determining, by the base station, the sequence according to an information bit quantity of the uplink control information, and determining, by the base station, an information bit sequence of the uplink control information according to the sequence corresponding to the signal carried on the symbol l.

2. The method according to claim 1, wherein the determining, by the base station, an information bit sequence of the uplink control information according to the sequence corresponding to the signal carried on the symbol l further comprising:

determining, by the base station, according to the sequence corresponding to the signal carried on the symbol l, a second bit sequence carried on the symbol l;

determining, by the base station, the information bit sequence of the uplink control information according to the second bit sequence carried on the symbol l.

3. The method according to claim 2, wherein the second bit sequence is determined according to a status of a hybrid automatic repeat request-acknowledgment (HARQ-ACK).

4. The method according to claim 2, wherein the determining, by the base station according to the sequence corresponding to the signal carried on the symbol l, a second bit sequence carried on the symbol l comprises:

determining, by the base station according to a cyclic shift of the sequence corresponding to the signal carried on the symbol l, the second bit sequence carried on the symbol l, wherein the cyclic shift of the sequence is corresponding to a status value of the second bit sequence, wherein the cyclic shift of the sequence is one of M cyclic shifts, wherein the M cyclic shifts are in a one-to-one correspondence to M status values, wherein M is 2 raised to the power of $M_1$, wherein $M_1$ is a bit quantity of the second bit sequence, and wherein both M and $M_1$ are positive integers.

5. The method according to claim 4, wherein an interval of cyclic shifts corresponding to any two of the M status values is greater than or equal to 2.

6. An apparatus, comprising:
one or more processors, and
a non-transitory storage medium configure to store program instructions;
wherein, when executed by the one or more processors, the instructions cause the apparatus to:
receive uplink control information from a terminal device by using an uplink control channel, wherein the uplink control channel occupies N symbols, wherein N is equal to 1 or 2, wherein a signal carried on a symbol l of the N symbols is corresponding to a sequence, and wherein the sequence is a cyclic shift sequence;
determine the sequence according to an information bit quantity of the uplink control information; and
determine an information bit sequence of the uplink control information according to the sequence corresponding to the signal carried on the symbol l.

7. The apparatus according to claim 6, wherein to determine an information bit sequence of the uplink control information according to the sequence corresponding to the signal carried on the symbol l, the instructions cause the apparatus to:

determine, according to the sequence corresponding to the signal carried on the symbol l, a second bit sequence carried on the symbol l;

determine the information bit sequence of the uplink control information according to the second bit sequence carried on the symbol l.

8. The apparatus according to claim 7, wherein the determining, according to the sequence corresponding to the signal carried on the symbol l, a second bit sequence carried on the symbol l comprises:

determining, according to a cyclic shift of the sequence corresponding to the signal carried on the symbol l, the second bit sequence carried on the symbol l, wherein the cyclic shift of the sequence is corresponding to a status value of the second bit sequence, wherein the cyclic shift of the sequence is one of M cyclic shifts, wherein the M cyclic shifts are in a one-to-one correspondence to M status values, wherein M is 2 raised to the power of $M_1$, wherein $M_1$ is a bit quantity of the second bit sequence, and wherein both M and $M_1$ are positive integers.

9. The apparatus according to claim 6, wherein the instructions cause the apparatus further to determine a status of a HARQ-ACK according to the information bit sequence.

10. An uplink control information transmission method, comprising:

determining, a to-be-transmitted uplink control information;

determining, according to the to-be-transmitted uplink control information, a second bit sequence carried on a symbol l of an uplink control channel, wherein the uplink control channel occupies N symbols, and wherein N is equal to 1 or 2;

determining, according to a status value of the second bit sequence, a cyclic shift corresponding to the symbol l;

determining, according to the cyclic shift, a sequence corresponding to the symbol l;

mapping, the sequence corresponding to the symbol l onto the symbol l of the uplink control channel; and sending the sequence to a base station.

11. The method according to claim 10, wherein the second bit sequence is determined according to a status of a hybrid automatic repeat request-acknowledgment (HARQ-ACK).

12. The method according to claim 10, wherein the determining, according to the to-be-transmitted uplink control information, a second bit sequence carried on a symbol l of an uplink control channel comprises:

determining, an information bit sequence of the to-be-transmitted uplink control information; and determining, a first bit sequence according to the information bit sequence and a quantity N of symbols occupied by the uplink control channel, wherein a bit quantity of the first bit sequence is N or 2N; and determining, according to the first bit sequence, the second bit sequence carried on the symbol l of the uplink control channel, wherein the second bit sequence carried on the symbol l is a part, carried on the symbol l, of the first bit sequence.

13. The method according to claim 12, wherein a bit quantity of the information bit sequence is 1, wherein the bit quantity of the first bit sequence is N, and wherein the first bit sequence is obtained by cyclically repeating the information bit sequence for N times.

14. The method according to claim 12, wherein a bit quantity of the information bit sequence is 2, wherein the bit quantity of the first bit sequence is 2N, and wherein the first bit sequence is obtained by cyclically repeating the information bit sequence for N times.

15. The method according to any one of claim 10, wherein the status value of the second bit sequence is corresponding to the cyclic shift of the sequence, wherein the status value of the second bit sequence is one of M status values, wherein the M status values are in a one-to-one correspondence to M cyclic shifts, wherein M is 2 raised to the power of $M_1$, wherein $M_1$ is a bit quantity of the second bit sequence, and wherein both M and $M_1$ are positive integers.

16. The method according to claim 15, wherein an interval of cyclic shifts corresponding to any two of the M status values is greater than or equal to 2.

17. An apparatus, comprising:
one or more processors; and
a non-transitory storage medium configure to store program instructions;
wherein, when executed by the one or more processors, the instructions cause the apparatus to:
determining, a to-be-transmitted uplink control information;
determining, according to the to-be-transmitted uplink control information a second bit sequence carried on a symbol l of an uplink control channel, wherein the uplink control channel occupies N symbols, and wherein N is equal to 1 or 2;
determining, according to a status value of the second bit sequence, a cyclic shift corresponding to the symbol l;
determining, according to the cyclic shift, a sequence corresponding to the symbol l;
mapping, the sequence corresponding to the symbol l onto the symbol l of the uplink control channel; and
sending the sequence to a base station.

18. The apparatus according to claim 17, wherein the second bit sequence is determined according to a status of a hybrid automatic repeat request-acknowledgment (HARQ-ACK).

19. The apparatus according to claim 17, wherein the status value of the second bit sequence is corresponding to the cyclic shift of the sequence, wherein the status value of the second bit sequence is one of M status values, wherein the M status values are in a one-to-one correspondence to M cyclic shifts, wherein M is 2 raised to the power of $M_1$, wherein $M_1$ is a bit quantity of the second bit sequence, and wherein both M and $M_1$ are positive integers.

20. The apparatus according to claim 19, wherein an interval of cyclic shifts corresponding to any two of the M status values is greater than or equal to 2.

* * * * *